(12) United States Patent  (10) Patent No.: US 8,154,962 B2
Mori et al.  (45) Date of Patent: Apr. 10, 2012

(54) OPTICAL PICKUP AND OPTICAL INFORMATION RECORDING AND REPRODUCING DEVICE

(75) Inventors: Hiromitsu Mori, Fujisawa (JP); Tomoto Kawamura, Tokyo (JP); Yoshiro Konishi, Yokohama (JP); Toshimasa Kamisada, Yokohama (JP); Yasuo Kitada, Odawara (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 1394 days.

(21) Appl. No.: 11/672,133

(22) Filed: Feb. 7, 2007

(65) Prior Publication Data

US 2008/0095014 A1  Apr. 24, 2008

(30) Foreign Application Priority Data

Oct. 18, 2006 (JP) ................................. 2006-283247

(51) Int. Cl.
*G11B 7/00* (2006.01)
(52) U.S. Cl. ................................. 369/44.37; 369/112.26
(58) Field of Classification Search .... 369/44.11–44.32, 369/112.01–112.14
See application file for complete search history.

(56) References Cited

U.S. PATENT DOCUMENTS

| 7,881,168 | B2* | 2/2011 | Kim et al. ................... 369/44.37 |
| 2003/0169664 | A1* | 9/2003 | Katayama ................... 369/53.26 |
| 2003/0218952 | A1* | 11/2003 | Katayama et al. ......... 369/53.26 |
| 2004/0165520 | A1 | 8/2004 | Heor et al. |
| 2005/0111516 | A1* | 5/2005 | Hatano et al. ................. 372/106 |
| 2005/0224693 | A1* | 10/2005 | Ikenaka et al. ............. 250/201.5 |
| 2006/0007812 | A1* | 1/2006 | Nishi et al. ................. 369/44.37 |
| 2006/0136951 | A1* | 6/2006 | Nakao et al. ................... 720/659 |
| 2006/0285473 | A1* | 12/2006 | Kan ........................... 369/112.16 |
| 2007/0041304 | A1* | 2/2007 | Tadaki et al. ............ 369/112.01 |
| 2007/0230964 | A1* | 10/2007 | Ishika ........................... 398/112 |

(Continued)

FOREIGN PATENT DOCUMENTS

CN 1551151 12/2004

(Continued)

OTHER PUBLICATIONS

Office Action issued in Chinese Patent Application No. 2007100913185 on Nov. 20, 2009.

(Continued)

*Primary Examiner* — Tan X Dinh
(74) *Attorney, Agent, or Firm* — Antonelli, Terry, Stout & Kraus, LLP.

(57) ABSTRACT

An optical pickup equipped with a laser light source which emits light beams of at least three wavelengths for recording/reproducing a plurality of information recording media detects light quantities of the light beams of three wavelengths using one light intensity monitor element. More specifically, one light intensity monitor element is arranged between a first laser light source and a second laser light source, light beams of wavelength λ1 and wavelength λ2 emitted from the first laser light source are made to proceed substantially straightforward, the optical path of the light beam of wavelength λ3 emitted from the second laser light source is changed to a diagonal one so as to cause the light beam to be introduced diagonally to the light receiving surface of the one light intensity monitor element. Furthermore, the central axis line of the light receiving surface of the one light intensity monitor element is separated from the emitted light axis of the first laser light source and a reflecting member is provided above the emitting light axis of the second laser light source.

11 Claims, 21 Drawing Sheets

U.S. PATENT DOCUMENTS

| | | | |
|---|---|---|---|
| 2008/0019224 A1* | 1/2008 | Ishibashi | 369/30.03 |
| 2009/0154310 A1* | 6/2009 | Hotta et al. | 369/44.32 |
| 2010/0103803 A1* | 4/2010 | Yamasaki et al. | 369/112.24 |
| 2010/0271925 A1* | 10/2010 | Yamasaki et al. | 369/112.03 |

FOREIGN PATENT DOCUMENTS

| | | |
|---|---|---|
| CN | 1779804 | 5/2006 |
| JP | 2005-141872 | 6/2005 |
| JP | 2005-327388 | * 11/2005 |
| JP | 2006-139844 | 6/2006 |
| JP | 2006-268899 | 10/2006 |

OTHER PUBLICATIONS

Office Action issued in Japanese Patent Application No. 2006-283247 on Oct. 5, 2010.

* cited by examiner

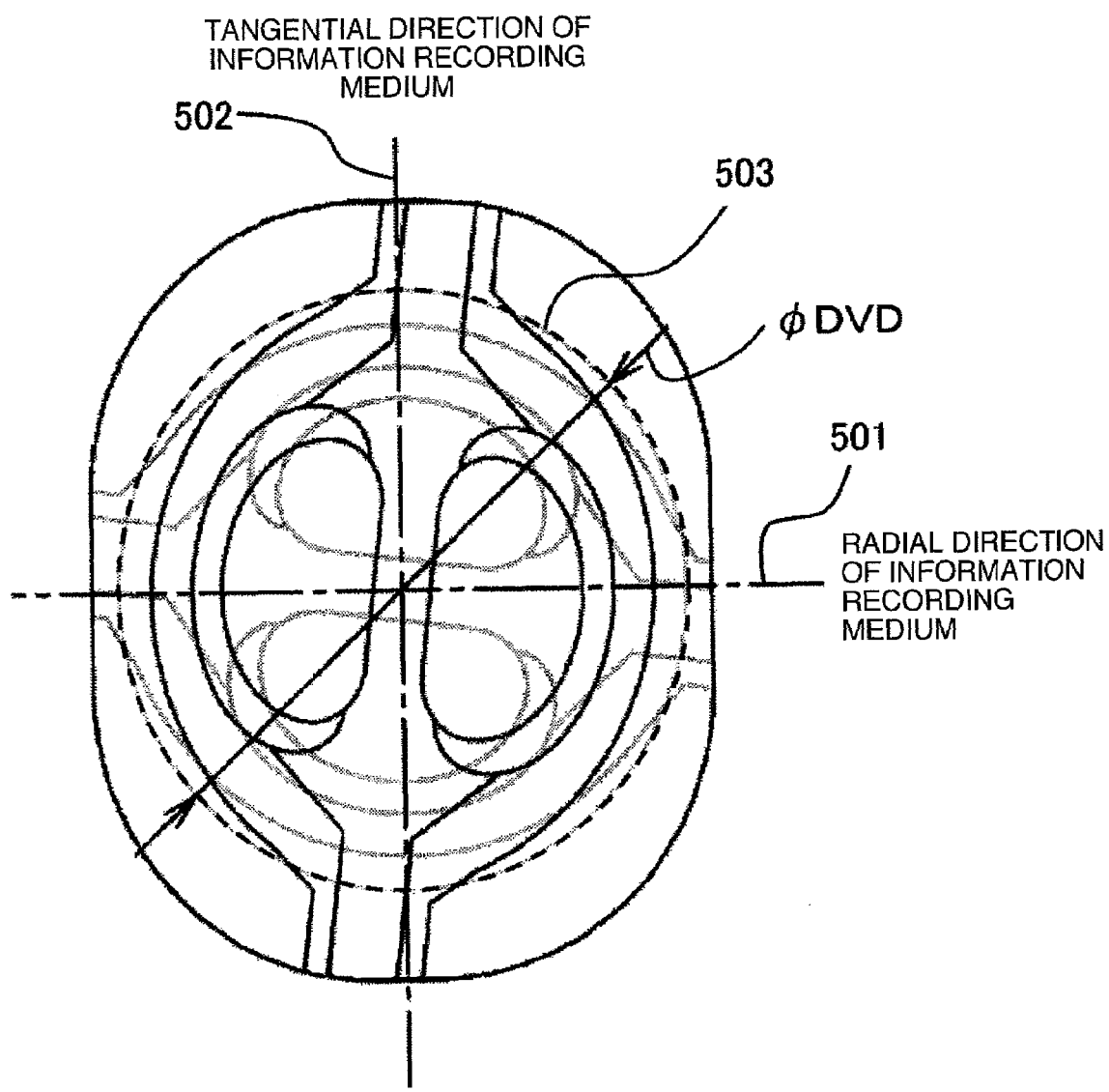

DVD SYSTEM LIGHT-INTENSITY DISTRIBUTION ON FRONT MONITOR 123

CD SYSTEM LIGHT-INTENSITY DISTRIBUTION ON FRONT MONITOR 123

LIGHT-INTENSITY DISTRIBUTION OVER REFLECTING MIRROR 103

LIGHT-INTENSITY DISTRIBUTION ON REFLECTING SURFACE 401 OF REFLECTING MEMBER 126

LIGHT-INTENSITY DISTRIBUTION IN THE VICINITY OF LIGHT RECEIVING SURFACE 129 OF FRONT MONITOR 123

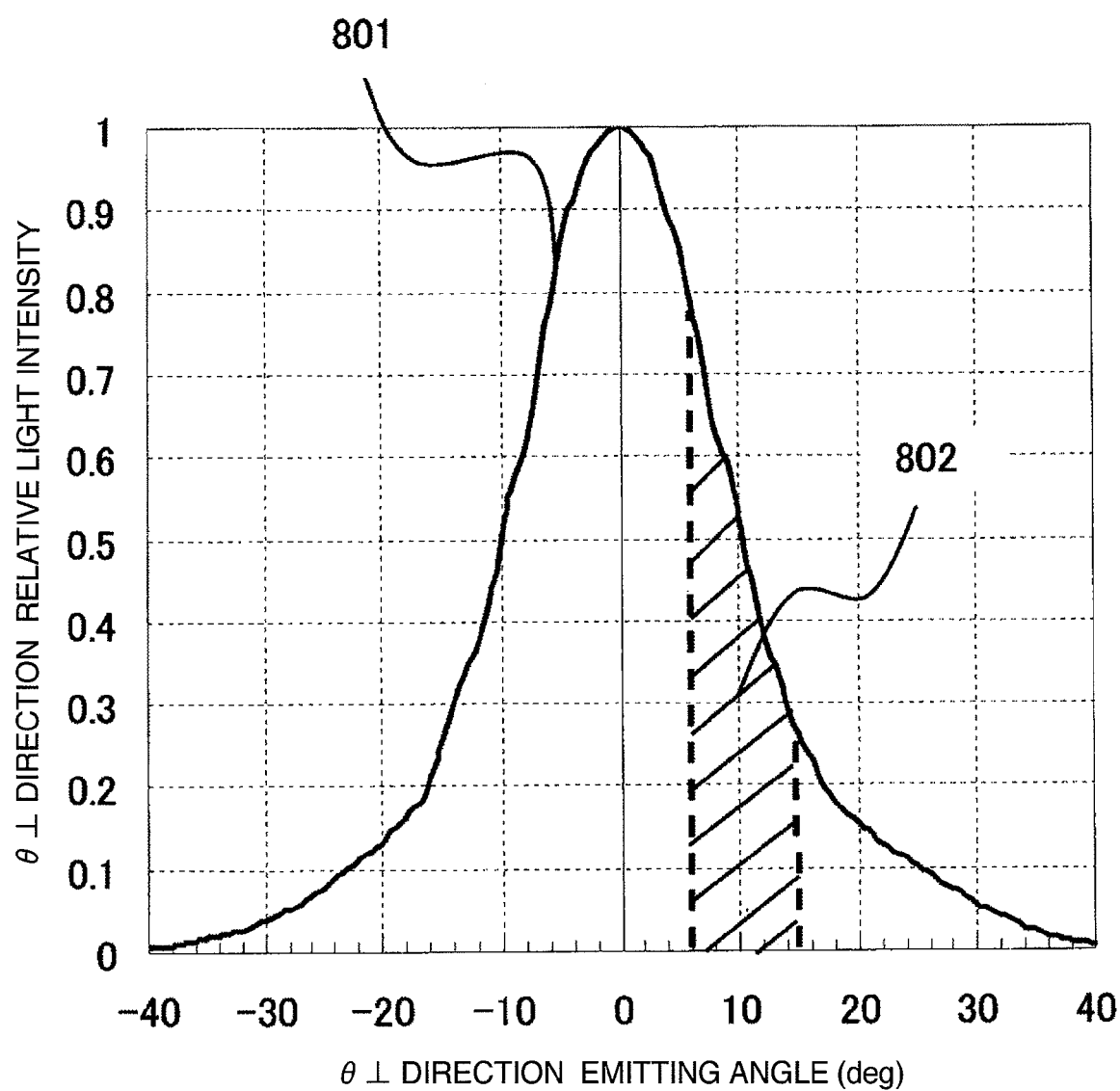

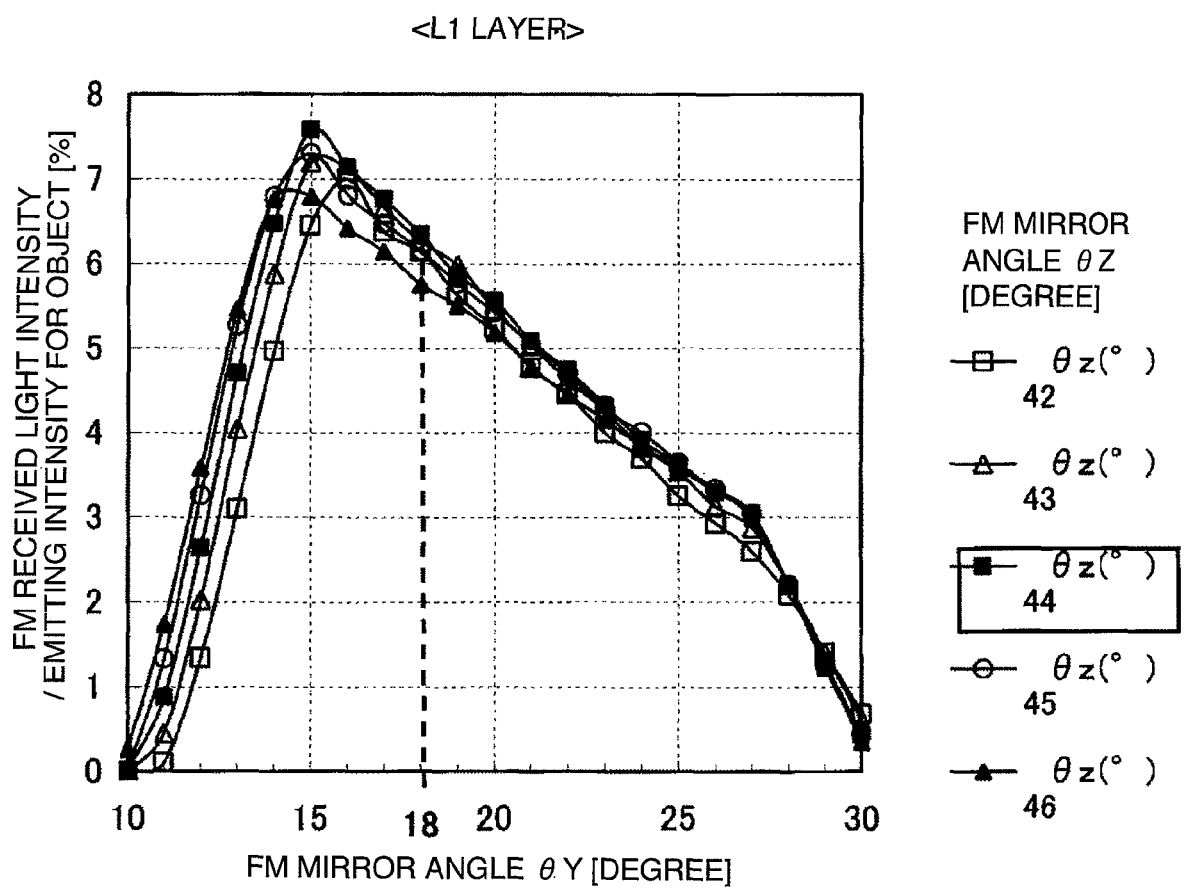

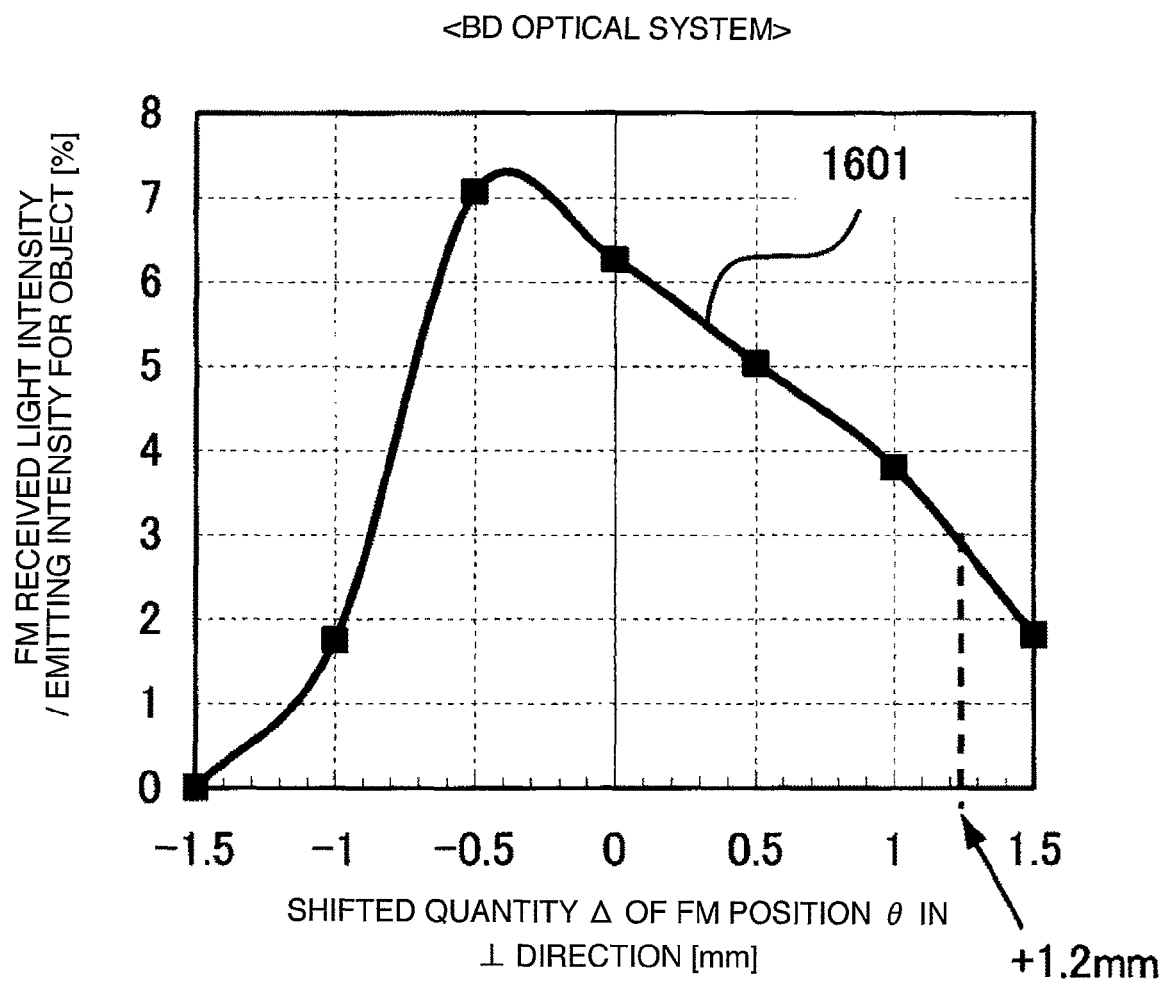

OPTICAL PICKUP AND OPTICAL INFORMATION RECORDING AND REPRODUCING DEVICE

INCORPORATION BY REFERENCE

The present application claims priority from Japanese application JP2006-283247 filed on Oct. 18, 2006, the content of which is hereby incorporated by reference into this application.

BACKGROUND OF THE INVENTION

The present invention relates to an optical pickup and an optical information recording/reproducing device.

An example of background techniques of this technical field is JP-A-2005-327388. This publication describes "saving space of an optical system which records/reproduces a CD, DVD, BD." Another background technique of this technical field is JP-A-2006-139844. This publication describes "providing an optical pickup device which stabilizes a quantity of light incident upon a monitor element which monitors a light intensity of a laser light source against a wavelength variation of the light source."

BRIEF SUMMARY OF THE INVENTION

When an information signal is recorded/reproduced into/from an optical information recording medium using an optical pickup, it is an indispensable condition for stable and accurate recording and reproduction operation that the light intensity of a light beam irradiated onto an optical information recording medium be controlled to a desired value. For this reason, a recordable optical pickup in particular is provided with means for detecting a light intensity of a light beam emitted from a laser light source, causes the detected light intensity to be fed back to a control circuit of the laser light source and thereby controls the light intensity of the light beam to a desired value.

A construction mounted with a monitor element for receiving a part of a light beam is generally used to detect a light intensity of the light beam emitted from a laser light source. A monitor element which receives a light beam emitted toward the front of the laser light source in this way will be referred to as a "front monitor" in the present specification.

Compared to an optical pickup mounted in a BD recorder or a desktop computer, a BD drive incorporated in a notebook personal computer or an optical disk camera using a BD medium is subject to restrictions on a projection area when viewed from above the optical pickup and thickness, and a mountable space thereof is limited. Therefore, it is necessary to totally reduce the sizes of optical parts and on the other hand, it is necessary to adopt a construction which can be actually assembled and adjusted.

As described above, it is important for the BD drive incorporated in a notebook personal computer or the optical disk camera using a BD medium to adopt an optical pickup provided with a three-wavelength compatible front monitor which shares one light intensity monitor element among BD and DVD/CD optical systems.

In order to make available the three-wavelength front monitor whose light receiving sensitivity has different characteristics depending on the wavelength of incident light, it is an issue to be addressed to improve means and construction for guiding light to the three-wavelength front monitor and allow an appropriate light intensity to be introduced to the three-wavelength front monitor.

It is an object of the present invention to provide a small optical pickup which allows one front monitor to be commonly used for three wavelengths in a BD/DVD/CD optical system and an optical information recording/reproducing device mounted therewith.

The above described object can be attained by a construction described in the scope of patent as an example.

The present invention can provide a small optical pickup which allows one front monitor to be commonly used for three wavelengths in a BD/DVD/CD optical system and an optical information recording/reproducing device mounted therewith.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIG. 5 shows an electrode pattern example of a liquid crystal aberration compensating element 116 in Embodiment 1;

FIG. 8 shows an example of a relative light intensity distribution in a $\theta\perp$ direction of the BD laser light source 101 in Embodiment 1;

FIG. 15 is a graph showing FM sensitivity with the horizontal axis showing the setup angle $\theta Y$ and the vertical axis showing FM sensitivity using the setup angle θZ as a parameter in the L1 layer of BD in Embodiment 1;

FIG. 16 is a graph showing an FM sensitivity calculation result when the setup angle θY of the reflecting member 126 is set to approximately 18°, θZ set to approximately 44° and a center line 302 of the light receiving surface 129 of the front monitor 123 shifted in the Z direction from the BD optical axis 201;

DETAILED DESCRIPTION OF THE INVENTION

Each embodiment of the present invention will explain an example of an optical pickup assuming three media of BD, DVD and CD. However, each embodiment of the present invention is not limited to three media of BD, DVD and CD and may also be applied to other media such as a medium of HD-DVD.

Embodiment 1

Embodiment 1 of the present invention will be explained using FIG. 1 to FIG. 17. This embodiment will explain an overall construction of each optical system of BD, DVD and CD using FIG. 1, FIG. 2, FIG. 3 and FIG. 5 first and then a front monitor optical system which is a main part of the present invention using FIG. 1 to FIG. 17.

Figure 1:
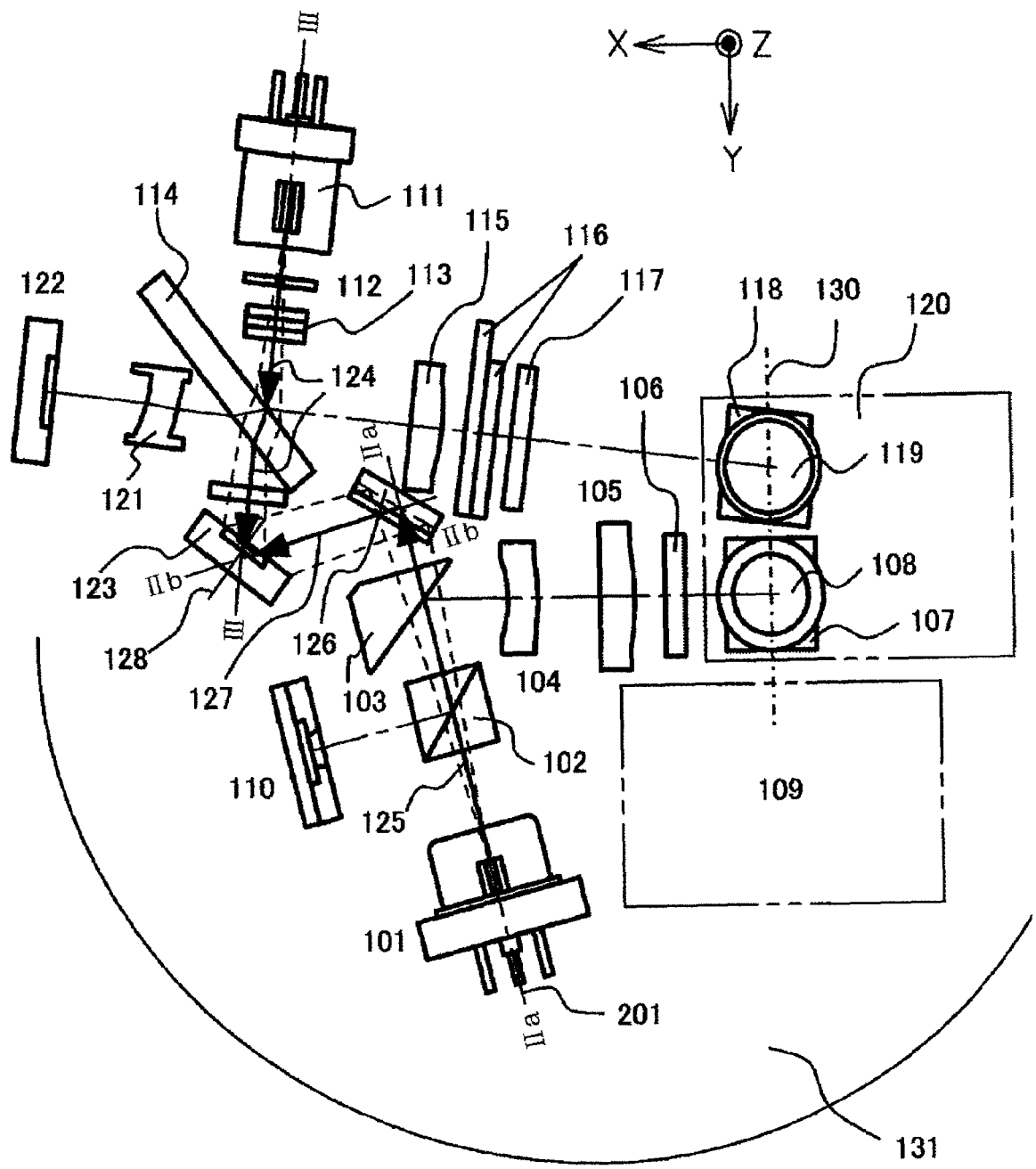
FIG. 1 is a top view showing an outline of an optical pickup compatible with BD, DVD and CD in Embodiment 1.
Figure 2A:
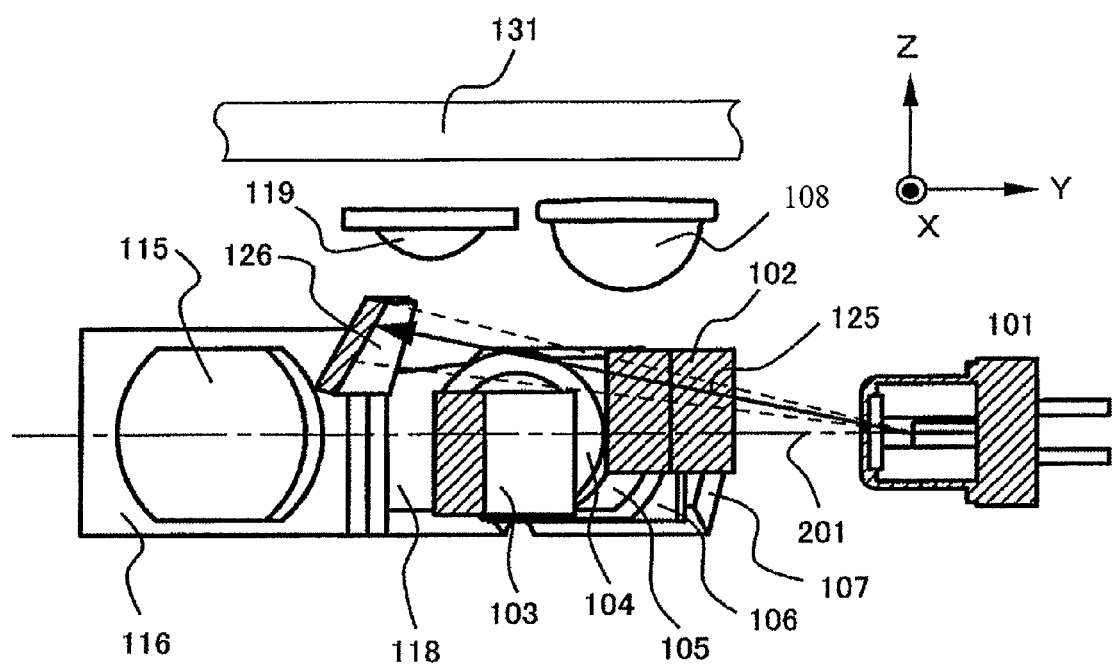
FIGS. 2a and 2b show a B-B section of FIG. 1 and an A-A section of FIG. 1.
Figure 2B:
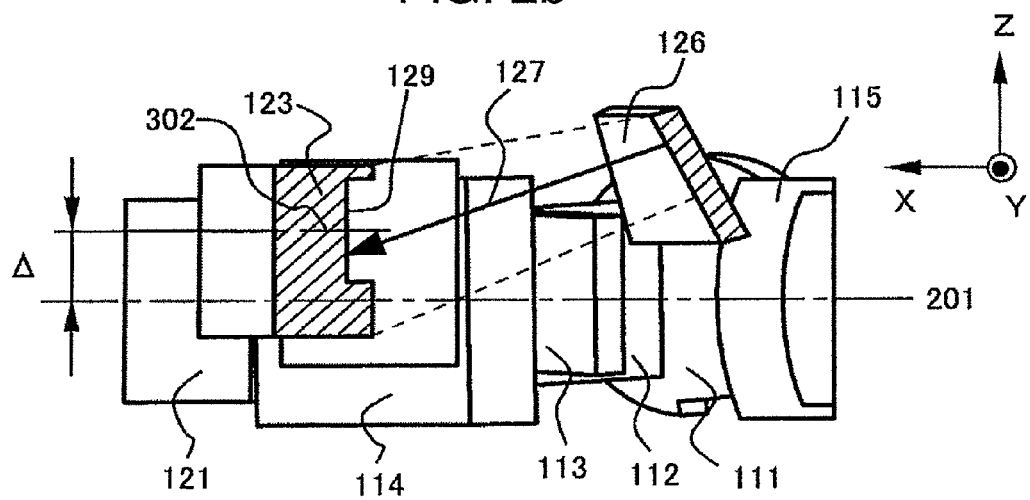
Figure 3:
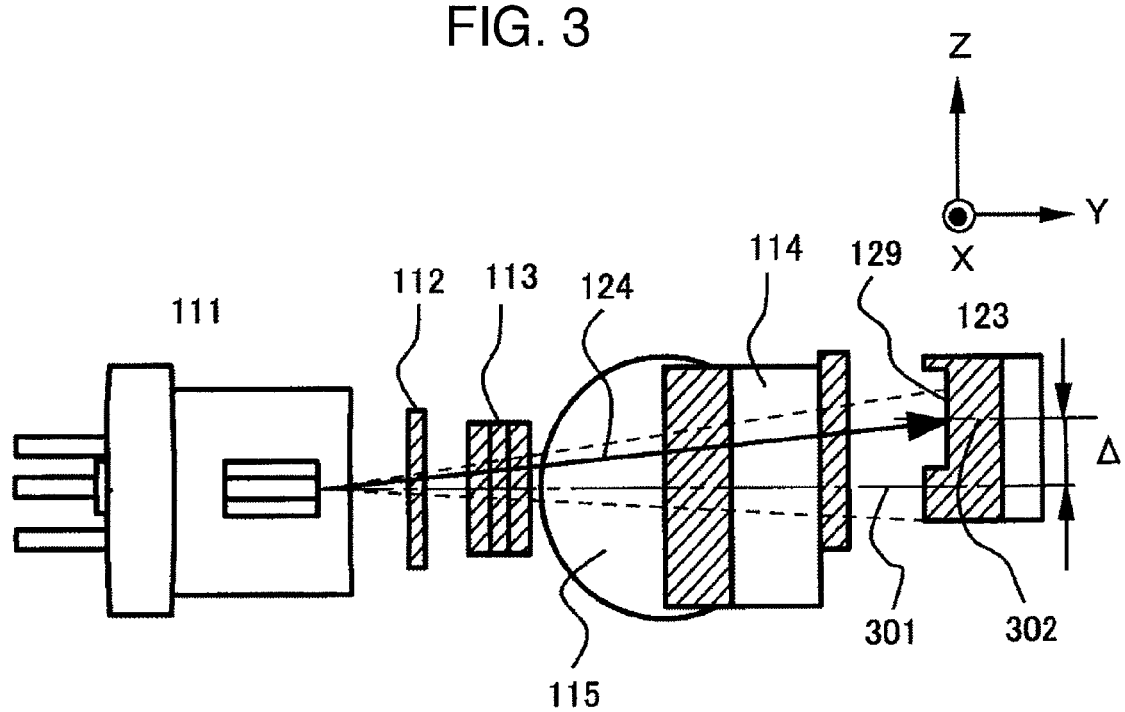
FIG. 3 shows a C-C section of FIG. 1.

FIG. 1 is a top view showing an outline of the optical pickup corresponding to a BD, DVD and CD, FIG. 2a shows a B-B section of FIG. 1, FIG. 2b shows an A-A section of FIG. 1 and FIG. 3 shows a C-C section of FIG. 1.

A BD optical system will be explained hereinafter first. A light beam in 405 nm band is emitted from a BD laser light source 101 as divergent light of linearly polarized light, the light beam emitted from the BD laser light source 101 passes through a polarization beam splitter 102, a reflecting mirror 103 and an auxiliary lens 104 and is transformed into a substantially parallel light beam by a BD collimating lens 105. The BD collimating lens 105 is driven by a BD collimating lens drive device 109 enclosed by a two-dot dashed line. Here, the BD collimating lens drive device 109 has a construction using a piezoelectric element, for example, and drives the BD collimating lens 105 in a direction parallel to the light beam incident upon the BD collimating lens 105 (X direction) using expansion and contraction of this piezoelectric element in the X direction. Furthermore, as the BD collimating lens drive device 109, a construction using a small stepping motor may be used. A diffraction groove is formed on the surface of the BD collimating lens 105 and compensates for chromatic aberration caused by a momentary wavelength variation of the BD laser light source 101. It is also possible to provide a separate chromatic aberration compensating element on the surface of the BD collimating lens 105 instead of providing the diffraction groove.

The light beam proceeding through the BD collimating lens 105 is introduced to a multifunction element 106. The multifunction element 106 is an element obtained by pasting and uniting a polarizing diffraction grating and a ¼λ wave plate together. The polarizing diffraction grating has the function of diffracting the light beam of linearly polarized light in a predetermined direction and letting pass the light beam of the linearly polarized light in a direction orthogonal to the direction thereof. Therefore, the multifunction element 106 which unites the polarizing diffraction grating and the ¼λ wave plate lets pass the light beam proceeding from right to left on the surface of the paper and diffracts the light beam proceeding from left to right on the surface of the paper. That is, the light beam incident from the BD collimating lens 105 penetrates without being diffracted in the area of the polarizing diffraction grating of the multifunction element 106 and is circularly polarized by the ¼λ wave plate. The light beam circularly polarized by the multifunction element 106 is reflected in the Z direction by a BD raising mirror 107, introduced to a BD objective lens 108 and condensed and irradiated onto an information recording medium 131 or a data layer (not shown) of the BD here.

The light beam reflected by the above described data layer (not shown) is introduced to the BD objective lens 108, BD raising mirror 107 and multifunction element 106. The light beam incident upon the multifunction element 106 is transformed from circularly polarized light in the area of the ¼λ wave plate to linearly polarized light in a direction orthogonal to an outward path (optical path from the BD laser light source 101 to the BD objective lens 108) and branched into a plurality of light beams in the area of the polarizing diffraction grating. Any pattern may be used as the grating groove pattern of the polarizing diffraction grating if it is at least a pattern for which it is possible to use a knife-edge method as the detection scheme for a focus error signal (hereinafter, referred to as "FES") and a push-pull scheme (hereinafter, referred to as "PP") as the detection scheme of a tracking error signal (hereinafter, referred to as "TES"). The knife-edge method and the PP scheme are common detection schemes and publicly known techniques, and therefore explanations thereof will be omitted here.

The light beam branched into a plurality of beams by the multifunction element 106 passes through the BD collimating lens 105, auxiliary lens 104, reflecting mirror 103, polarization beam splitter 102 and reaches the BD light detector 110. The light beam guided to the BD light detector 110 is used to detect an information signal recorded in the data layer of the BD and detection of a position control signal of the condensed spot condensed and irradiated on the optical disk such as TES and FES. The BD light detector 110 may have any light receiving area pattern if it is at least a light receiving area pattern for which the above described scheme can be used.

The detection scheme combining the knife-edge method and PP scheme has been explained above, but the present invention is also applicable to a case where optical parts are changed by combining, for example, a spot size method and a PP scheme or the like. The spot size method is a common detection scheme and publicly known technique, and therefore explanations thereof will be omitted here. Hereinafter, suppose the optical path from the BD laser light source 101 to the data layer of the BD (not shown) is referred to as an outward path and the optical path from the data layer (not shown) to the BD light detector 110 is referred to as a return path. The BD has a storage capacity approximately five times as large as a DVD and an information pit of the BD data layer is smaller than that of the DVD. Therefore, reproducing the BD requires a smaller light spot to be irradiated onto the data layer (not shown) of the BD than that of the DVD. The light spot not only strongly depends on a numerical aperture (NA) of the objective lens and a wavelength of the laser light source but also depends on a magnification of the outward path (the combined focal distance of the auxiliary lens 104 and BD collimating lens 105/focal distance of objective lens) and taking a large magnification of the outward path can reduce condensing spots. For this reason, the BD optical system needs a greater outward magnification than that of the DVD. When a general semiconductor laser is used and an emitted light beam thereof is not shaped, a magnification of the outward path is preferably set to approximately 5 times to 7 times for the DVD, while it is preferably set to approximately 10 times to 14 times for the BD and this embodiment sets the outward path magnification within these ranges.

The BD uses an objective lens of a large numerical aperture of 0.85 to reduce the light spot condensed on the data layer (not shown). However, a spherical aberration generated due to a thickness error in the cover layer increases in proportion to the fourth power of NA and this spherical aberration due to the thickness error in this cover layer cannot be ignored in the BD and therefore a mechanism for compensating for this spherical aberration is required. To compensate for the spherical aberration, means for transforming the light beam incident upon the objective lens from a parallel to weakly divergent or weakly convergent beam is generally used. As the means for transforming the light beam incident upon the BD objective lens 108 from parallel to weakly divergent or weakly convergent beam, this embodiment does not adopt a beam expander (which has the function of combining a concave lens and a convex lens, expanding incident parallel light and emitting the parallel light) due to restrictions on space but provides a BD collimating lens drive device 109 so as to move the BD collimating lens 105 in the optical axis direction. The movable range and the compensation sensitivity in the compensation for a spherical aberration depend on the focal distance of the BD collimating lens 105. That is, there is such a relationship that when the focal distance is short, the movable range is small and the compensation sensitivity is high; on the contrary when the focal distance is long, the movable range is large and the compensation sensitivity decreases. The thickness error in the cover layer of a BD is defined by a standard and, for example, the cover layer of a 2-layer BD varies over a range of 70 μm to 105 μm. Therefore, the focal distance of the BD collimating lens 105 is preferably set within a range of approximately 9 to 12 mm and this embodiment sets it within this range. Furthermore, when operating, the BD collimating lens drive device 109 including the BD collimating lens 105 is set in such a way that an axial shift of the information recording medium 131 in the radial direction (Y direction) is suppressed and that the resonance frequency involved in vibration in the Y direction is within the band frequency of a tracking control system (not shown) at the time of startup or stop in particular.

Next, the DVD/CD optical system will be explained. Reference numeral 111 denotes a two-wavelength multilaser, which is a laser light source incorporating two laser chips which emit light beams of different wavelengths in a casing thereof. The two-wavelength multilaser 111 is mounted with a DVD laser chip (not shown) which emits a light beam having a wavelength of approximately 660 nm and a CD laser chip (not shown) which emits a light beam having a wavelength of approximately 780 nm. The DVD optical system will be explained first.

A linearly polarized DVD light beam is emitted as divergent light from the DVD laser chip (not shown) of the two-wavelength multilaser 111. The light beam emitted from the above described DVD laser chip is introduced to a wideband ½λ wave plate 112 and is transformed into linearly polarized light in a predetermined direction. When light beams in wavelength approximately 660 nm band and wavelength approximately 780 nm band are introduced, the wideband ½λ wave plate 112 is an element which functions as a ½λ wave plate for both wavelengths and is generally used for a current DVD/CD compatible optical pickup.

The light beam is then introduced to a wavelength selective diffraction grating 113. The wavelength selective diffraction grating 113 is an optical element which branches the light beam at a diffraction angle θ1 when the light beam having a wavelength of approximately 660 nm is introduced and branches the light beam at an angle θ2 which is different from a diffraction angle θ1 when the light beam having a wavelength of approximately 780 nm is introduced. Such a wavelength selective diffraction grating 113 can be manufactured by adjusting the groove depth of the diffraction grating and refractive index and is used for an optical pickup mounted with a two-wavelength multilaser light source in recent years. The light beam is branched by the wavelength selective diffraction grating 113 into one main light beam and two sub light beams and the two sub light beams are used for generating a signal based on a DPP and a differential astigmatic detection (DAD). The DPP and DAD are publicly known techniques and therefore explanations thereof will be omitted here. The light beam which has passed through the wavelength selective diffraction grating 113 is reflected by a dichroic half mirror 114 and then transformed into a substantially parallel light beam by a collimating lens 115. The light beam which has passed through the collimating lens 115 is introduced to a liquid crystal aberration compensating element 116. This liquid crystal aberration compensating element 116 has the function of compensating for coma aberration in a predetermined direction of the light beam of the DVD. Furthermore, an electrode pattern as shown in FIG. 5, for example, is set so as to be able to compensate for coma aberration also for the light beam of the CD in the same way as for the DVD though the compensation quantity is different. In FIG. 5, an axis line 501 corresponds to a radial direction (Y direction in FIG. 1) of the information recording medium 131, while an axis line 502 corresponds to a tangential direction (X direction in FIG. 1) of the information recording medium 131 and a dotted line 503 shows an effective beam diameter (ϕDVD) of the DVD light in the setup position of the liquid crystal aberration compensating element 116. The same figure shows the electrode patterns corresponding to the radial direction and the tangential direction of the information recording medium 131 with one superimposed on the other. The light beam which has passed through the liquid crystal aberration compensating element 116 is introduced to a wideband ¼ wave plate 117 and is transformed into circularly polarized light. The wideband ¼λ wave plate 117 is also an optical element which functions as a ¼λ wavelength plate for both DVD and CD light beams. The light beam which has passed through the wideband ¼ wave plate 117 is reflected by a raising mirror 118 in the Z direction, introduced to a DVD/CD compatible objective lens 119 and condensed and irradiated onto the information recording medium 131 or the data layer of the DVD (not shown) here. The DVD/CD compatible objective lens 119 and the BD objective lens 108 are mounted on an objective lens actuator 120 in an area enclosed by a two-dot dashed line and can be driven to translation in the Y direction and the Z direction, and rotation around the X axis.

The light beam reflected by the above described data layer (not shown) proceeds through the DVD/CD compatible objective lens 119, raising mirror 118, wideband ¼λ wave plate 117, liquid crystal aberration compensating element 116, collimating lens 115, dichroic half mirror 114, detection lens 121 and reaches a light detector 122. The light beam is given astigmatism when passing through the dichroic half mirror 114 and is used to detect FES. The detection lens 121 has the function of turning the orientation of astigmatism in an arbitrary direction and at the same time determining the size of the condensing spot on the light detector 122. The light beam guided to the light detector 122 is used to detect an information signal recorded in the data layer (not shown) of the DVD and detect a position control signal of the condensing spot condensed and irradiated onto the data layer of the DVD such as TES and FES. Here, the upper side of FIG. 1 corresponds to the direction of the inner circumference of the information recording medium 131 and the under side corresponds to the direction of the outer circumference of the information recording medium 131. Though the two objective lenses; the DVD/CD compatible objective lens 119 and the BD objective lens 108 are juxtaposed to each other in the radial direction of the information recording medium 131, when the optical pickup is manufactured, the respective optimum tilt angles may differ depending on the radial direction and the tangential direction of the information recording medium of the DVD/CD compatible objective lens 119 and the BD objective lens 108. The liquid crystal aberration compensating element 116 is mounted to compensate for the difference in this optimum tilt angle. Since the difference in the tilt angle corresponds to a coma aberration, the liquid crystal aberration compensating element 116 has the function of compensating for coma aberrations in the radial direction and the tangential direction of the information recording medium.

Next, the optical system of the CD will be explained. A linearly polarized CD light beam is emitted as divergent light from a CD laser chip (not shown) of the two-wavelength multilaser 111. The light beam emitted from the CD laser chip (not shown) is introduced to the wideband ½λ wave plate 112 and transformed into light linearly polarized in a predetermined direction. The light beam is then introduced to the wavelength selective diffraction grating 113, is branched into one main light beam and two sub light beams at a diffraction angle θ2 which is different from the above described diffraction angle θ1 and the two sub light beams are used to generate DPP and DAD signals. The light beam which has passed through the wavelength selective diffraction grating 113 is reflected by the dichroic half mirror 114, then transformed into a substantially parallel light beam by the collimating lens 115. The light beam which has proceeded through the collimating lens 115 is introduced to the liquid crystal aberration compensating element 116. The liquid crystal aberration compensating element 116 has the function of compensating for a coma aberration in a predetermined direction for the light beam of the CD, too. The light beam which has passed through the liquid crystal aberration compensating element 116 is introduced to the wideband ¼ wave plate 117 and is transformed into circularly polarized light. The light beam which has passed through the wideband ¼ wave plate 117 is reflected by the raising mirror 118 in the Z direction, introduced to the DVD/CD compatible objective lens 119 and condensed and irradiated onto the data layer (not shown) of the CD.

The light beam reflected by the data layer (not shown) of the CD passes through the DVD/CD compatible objective lens 119, raising mirror 118, wideband ¼λ wave plate 117, liquid crystal aberration compensating element 116, collimating lens 115, dichroic half mirror 114, detection lens 121 and reaches the light detector 122. The light beam is given astigmatism in the same way as for the DVD when passing through the dichroic half mirror 114 and is used to detect FES. The detection lens 121 also has the function of turning the orientation of astigmatism of the light beam of the CD in an arbitrary direction in the same way as for the light beam of the DVD and at the same time determining the size of the condensing spot at the light detector 122. The light beam guided to the light detector 122 is used to detect an information signal recorded in the data layer (not shown) of the CD and detect a position control signal of the condensing spot condensed and irradiated onto the data layer of the CD such as TES and FES.

By mounting the optical parts using the two-wavelength multilaser as shown above, it is possible to provide an optical pickup compatible with three media of BD, DVD and CD. Furthermore, the DVD/CD compatible objective lens 119 which is a first objective lens and the BD objective lens 108 which is a second objective lens are juxtaposed to each other in the radial direction of the information recording medium 131 and the DVD/CD optical system which is the first optical system and the BD optical system which is the second optical system are provided independently of each other in the space on the same side with respect to an axis line 130 connecting the centers of the above described DVD/CD compatible objective lens 119 and the above described BD objective lens 108 in the casing (not shown). Adopting such a construction can secure the performance of each optical system and moreover has the effect of facilitating assembly and adjustment of the optical system.

An outline of the optical system of the optical pickup has been explained so far, and the front monitor optical system which is the main part of the present invention will be explained hereinafter.

Before explaining the construction of the front monitor optical system of the present invention, a relationship between the electrical characteristic of one front monitor 123 and an appropriate light intensity of light of three wavelengths incident upon a light receiving surface 129 will be explained.

As for light of wavelength λ1 (780 nm band), wavelength λ2 (660 nm band) and wavelength λ3 (405 nm band), light receiving sensitivity on the light receiving surface 129 of one front monitor 123 is expressed as K1, K2, K3 respectively and a saturated voltage of the amplifier of the above described front monitor 123 is expressed as VS. Furthermore, in wavelength λ1 (780 nm band) and wavelength λ2 (660 nm band), the ratios of the light intensity incident upon the light receiving surface 129 of the front monitor 123 to the light intensity emitted from the DVD/CD compatible objective lens 119 which is the first objective lens are expressed as F01 and F02 respectively and in wavelength λ3 (405 nm band), the ratio of the light intensity incident upon the light receiving surface 129 of the front monitor 123 to the light intensity emitted from the BD objective lens 108 which is the second objective lens is expressed as F03. Furthermore, in wavelength λ1 (780 nm band) and wavelength λ2 (660 nm band), maximum light outputs necessary for recording by the DVD/CD compatible objective lens 119 which is the first objective lens to record are expressed as P1 and P2 respectively and in wavelength λ3

(405 nm band), maximum light output necessary for recording by the BD objective lens 108 which is the second objective lens is expressed as P3. At this time, it is necessary to set the above described values of F01, F02, F03 so as to simultaneously satisfy Formulas 1 to 3 shown below and these values indicate appropriate light quantities of light with three wavelengths incident upon the light receiving surface 129.

$$P1 \times F01 \times K1 < VS \quad \text{[Formula 1]}$$

$$P2 \times F02 \times K2 < VS \quad \text{[Formula 2]}$$

$$P3 \times F03 \times K3 < VS \quad \text{[Formula 3]}$$

However, K1, K2, K3 of the above described front monitor 123 have characteristics different from each other and compared to the case where the two-wavelength front monitor (having a small difference in light receiving sensitivity) for a conventional DVD and CD, the front monitor 123 needs to have an improved construction of the front monitor optical system and improved means for guiding light. This necessity derives from the fact that there is a precondition which will be shown below. Since a slim type three-wavelength optical pickup is required to accommodate a three-wavelength optical system in a limited space, the distance from the two-wavelength multilaser to the front monitor becomes shorter than that of the conventional slim type two-wavelength pickup and the coupling efficiency (ratio of a received light intensity of the front monitor to the emitted light of the laser light source) of the front monitor in the DVD and CD increases. Furthermore, from the standpoints of arrangement space and simplification of assembly and adjustment, and improvement of quality of light spots, the BD optical system of this embodiment adopts a construction which does not use any beam shaping element. Therefore, the coupling efficiency (ratio of an emitted light intensity of the objective lens to an emitted light intensity of the laser light source) of the BD objective lens 108 cannot help decreasing. Moreover, the DVD, CD optical system of this embodiment is mounted with the liquid crystal aberration compensating element 116 (having the function of compensating for a coma aberration in two directions) to compensate for two objective lenses, that is, the relative angle of inclination of the BD objective lens 108 and DVD/CD compatible objective lens 119. Therefore, the coupling efficiency (ratio of an emitted light intensity of the objective lens to an emitted light intensity of the laser light source) of the DVD/CD compatible objective lens 119 falls below that of the conventional two-wavelength (DVD, CD) optical system not using the liquid crystal aberration compensating element 116. As shown above, under the condition that the precondition of the front monitor optical system is different from that of the conventional two-wavelength optical pickup, it is necessary to improve the construction of the front monitor optical system and means for guiding light so that the front monitor sensitivity (ratio of a received light intensity of the front monitor to an emitted light intensity of the objective lens) satisfies [Formula 1] to [Formula 3] for all three wavelengths. Based on what has been explained above, the construction and means for guiding light of the front monitor optical system will be explained using FIG. 1 to FIG. 8 hereinafter.

When the optical pickup is viewed from above as shown in FIG. 1, the light emitting surface of the two-wavelength multilaser 111 which is a first laser light source and the light emitting surface of the BD laser light source 101 which is a second laser light source are arranged so as to face each other and one front monitor 123 is arranged in a space between them. The emitted light of the two-wavelength multilaser 111 which is the first laser light source proceeds substantially straightforward as shown by an arrow 124, while the emitted light from the BD laser light source 101 which is the second laser light source proceeds as shown by an arrow 125 and the optical path thereof is then changed diagonally by a reflecting member 126 as shown by an arrow 127. In this way, the light beam emitted from the two-wavelength multilaser 111 which is the first laser light source and the light beam emitted from the BD laser light source 101 which is the second laser light source are designed to enter the light receiving surface 129 of one front monitor 123 from both diagonal directions with respect to a center line 128.

When the optical pickup is viewed from one side as shown in FIG. 3, a center line 302 of the light receiving surface 129 of one front monitor 123 is shifted upward by Δ from the emitted light axis 301 from the two-wavelength multilaser 111 which is the first laser light source. Furthermore, as shown in FIG. 2a, a reflecting member 126 is provided above an emitted light axis 201 from the BD laser light source 101 which is the second laser light source to change the optical path as shown by an arrow 127 in FIG. 2b. Furthermore, the light receiving surface 129 of one front monitor 123 is arranged below with respect to the reflecting member 126. The outermost beam is shown by a dotted line in FIG. 1 to FIG. 3.

The two-wavelength multilaser 111 has the function of emitting light beams in wavelength 660 nm band and wavelength 780 nm band and the dichroic half mirror 114 which is the first branching optical element has the function of letting pass a part (e.g., approximately 10%) of the light beam emitted from the two-wavelength multilaser 111 and reflecting the remaining approximately 90% of the light beam and guiding it to the DVD/CD compatible objective lens 119 which is the first objective lens. The BD laser light source 101 which is the second laser light source emits a light beam in wavelength 405 nm band and the second branching optical element is composed of a first reflecting member and a second reflecting member. The above described first reflecting member is a reflecting mirror 103 which substantially totally reflects the light beam emitted from the BD laser light source 101 and guides the light to the BD objective lens 108 which is the above described second objective lens. The above described second reflecting member is a reflecting member 126 which changes the optical path of a part of the light beam emitted from the above described BD laser light source 101 and guides the light to the light receiving surface 129 of one front monitor 123.

Figure 4:
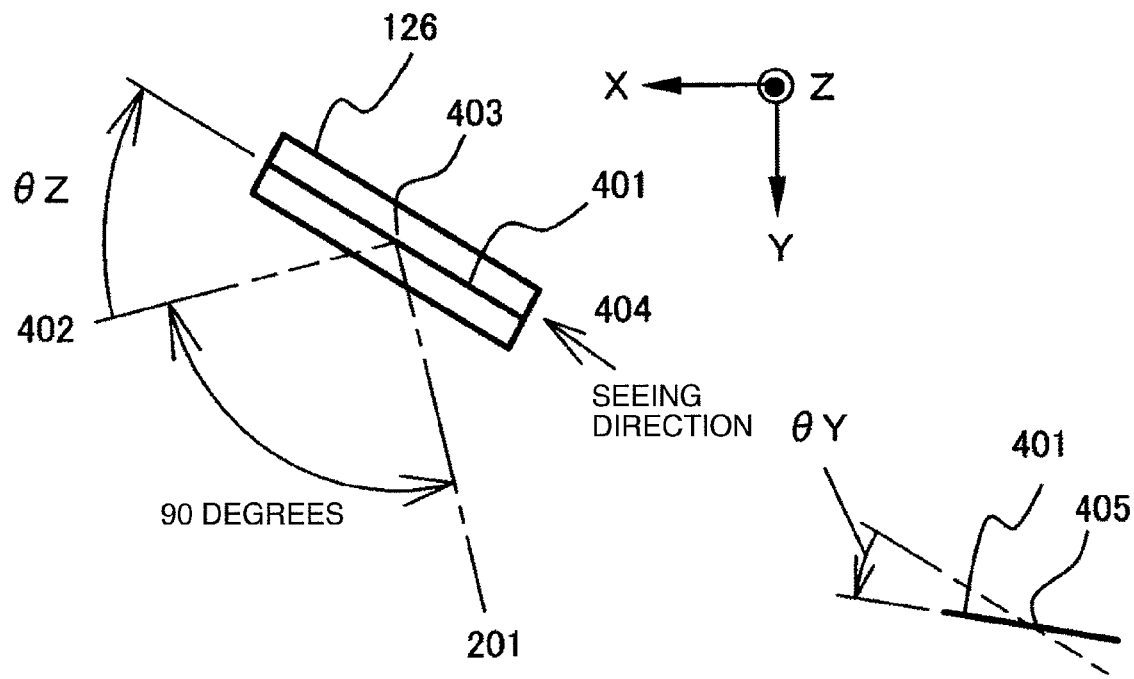
FIG. 4 illustrates a setup angle of a reflecting member 126 in Embodiment 1.

The above described reflecting member 126 is arranged above the reflecting mirror 103 and as shown in FIG. 4, this reflecting member 126 is arranged tilted by predetermined different angles θZ, θY degrees around the axis (Z) which is perpendicular to the above described information recording medium 131 and around the axis (Y) which is parallel thereto respectively. When explained more specifically, the present invention assumes an emitted light axis 201 from the BD laser light source 101, a point of intersection of an axis 402 which forms 90 degrees with this emitted light axis 201 and a reflecting surface 401 of the reflecting member 126 as a center of rotation and defines θZ as an angle around the Z axis measured from the above described axis 402. Furthermore, when viewed from the direction of an arrow 404, the present invention further defines θY as an angle around the Y axis with a point 405 as the center of rotation.

When the optical pickup of this embodiment is viewed from one side as shown in FIG. 3, a central axis 302 of the light receiving surface 129 of one front light monitor 123 is shifted by Δ in a direction perpendicular to the information recording medium 131 (Z direction), and as shown in FIG. 2, a central axis 302 of the light receiving surface 129 of one front monitor 123 is shifted by the same Δ in a direction perpendicular to the information recording medium 131 (Z direction) from the optical axis from 201 of the light emitted from the BD laser light source 101.

Figure 6A:
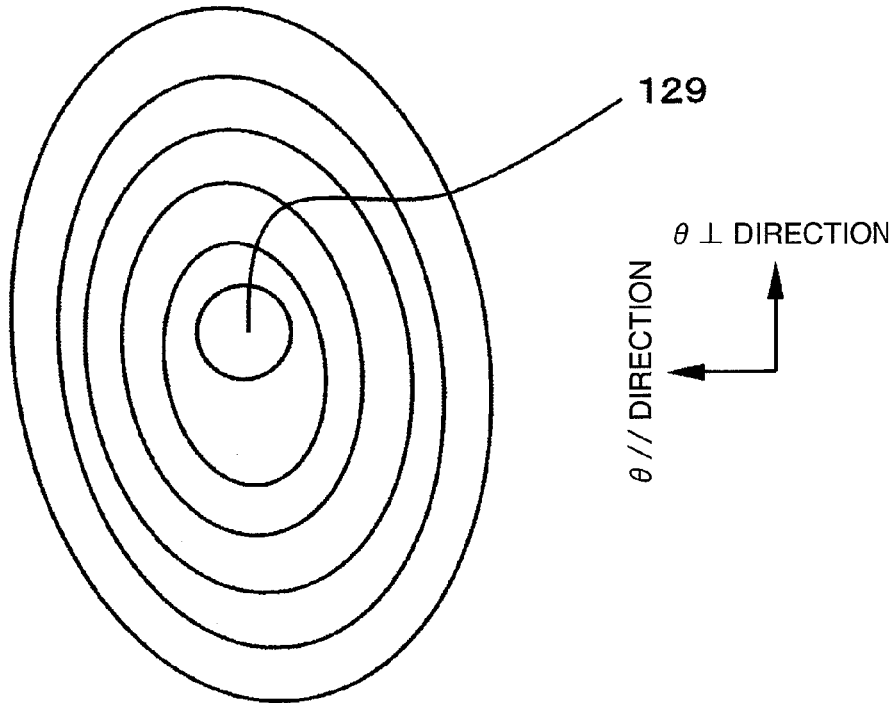
FIGS. 6a and 6b show examples of a light intensity distribution of DVD, CD light on a front monitor 123 in Embodiment 1.
Figure 6B:
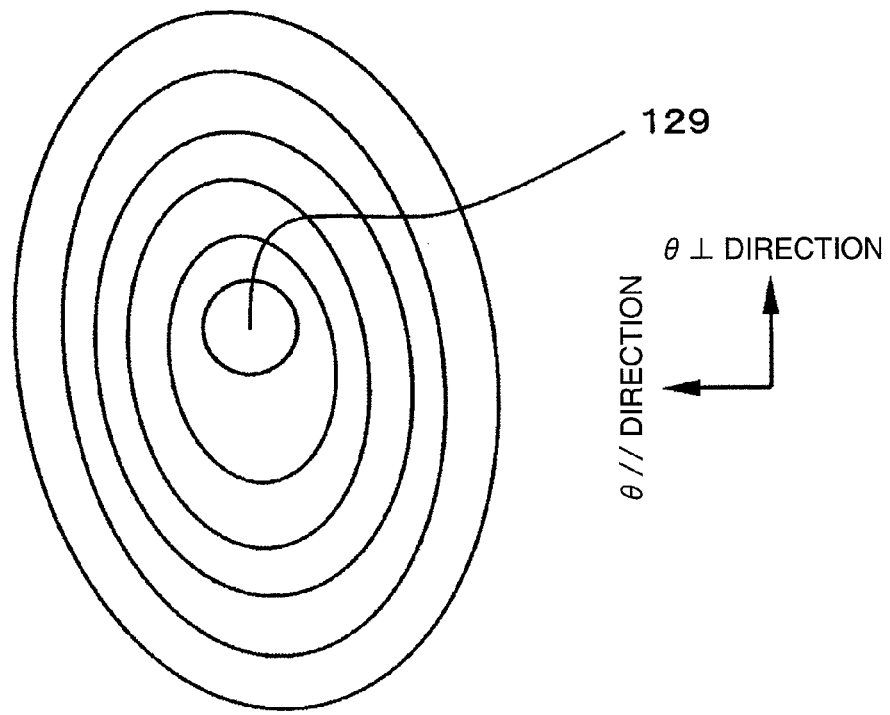
Figure 7A:
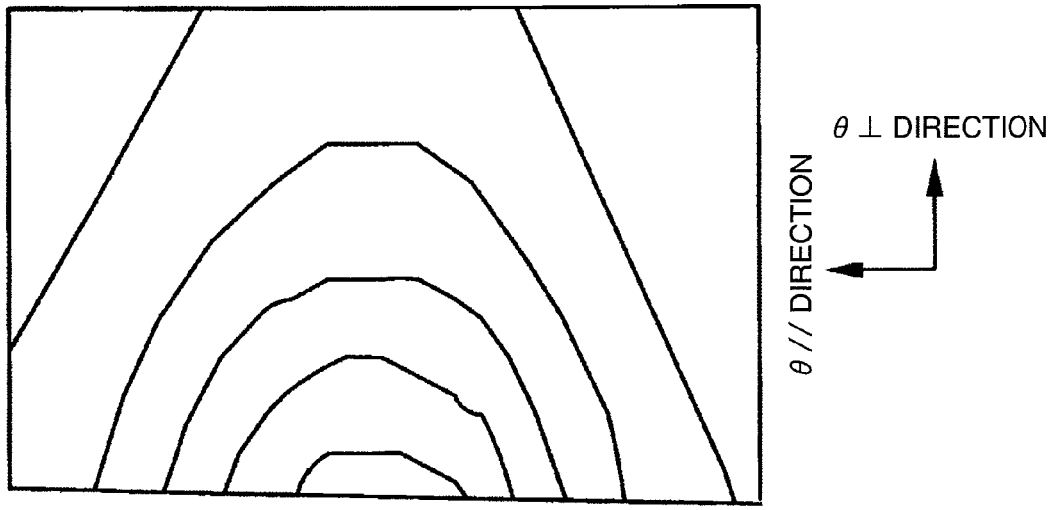
FIGS. 7a-c show examples of a light intensity distribution over a reflecting mirror 103 viewed from a BD laser light source 101, light intensity distribution on a reflecting surface 401 of a reflecting member 126 viewed from the BD laser light source 101 and light intensity distribution of BD light on the front monitor 123 viewed from the reflecting member 126 in Embodiment 1.
Figure 7B:
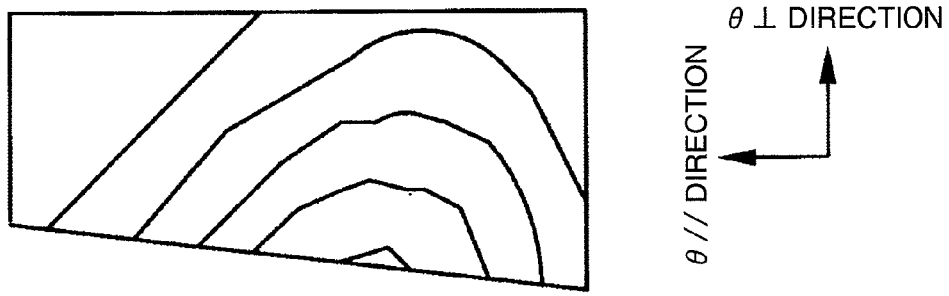
Figure 7C:
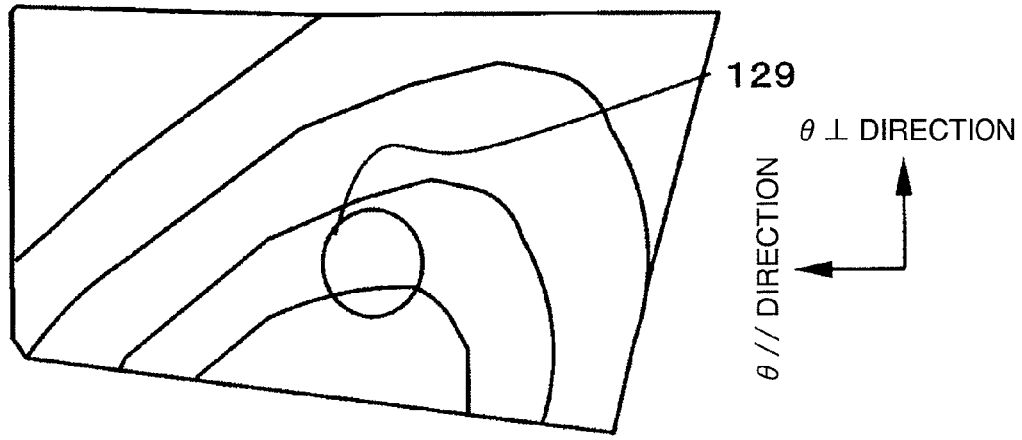

The two-wavelength multilaser 111 and the BD laser light source 101 are arranged such that the direction parallel to the chip activating layer (hereinafter referred to as "θ//direction") becomes substantially parallel to the information recording medium 131. FIGS. 6a, b show examples of light intensity distribution of the light of the DVD and CD on the front monitor 123 respectively and arranges the light receiving surface 129 of one front monitor 123 in the vicinity of the light intensity distribution center in the direction horizontal to the chip activating layer of the two-wavelength multilaser 111 (θ//direction) and direction perpendicular thereto (hereinafter referred to as "θ⊥direction"). FIG. 7a shows an example of light intensity distribution over the reflecting mirror 103 viewed from the BD laser light source 101, FIG. 7b shows an example of light intensity distribution on the reflecting surface 401 of the reflecting member 126 viewed from the BD laser light source 101 and FIG. 7c shows an example of light intensity distribution on the front monitor 123 viewed from the reflecting member 126.

As is appreciated from the same figure, the reflecting member 126 reflects the light having an intensity distribution at a place distant from the center of the light intensity distribution in the direction perpendicular to the chip activating layer of the BD laser light source 101 (θ⊥direction) so as to guide the BD laser light to the light receiving surface 129 of one front monitor 123. FIG. 8 shows a relative light intensity distribution 801 of the BD laser light source 101 in the θ⊥direction. In the case of this embodiment, when calculating the positional relationship of the reflecting member 126, light having an intensity distribution within a range from approximately 6 degrees to approximately 14 degrees away from the center (0 degrees) as shown by a diagonally shaded area 802 is used.

The reflecting member 126 is a flat mirror and the reflection coefficient of the reflecting surface 401 is set to be not more than 50%. The reflecting member 126 is not limited to the flat mirror of this embodiment and, for example, an optical waveguide may be used. Here, the optical waveguide is made of a transparent medium such as an optical fiber and has the function of guiding light to the light receiving surface 129 of the front monitor 123 by letting pass light through the medium. As shown in FIG. 2, the front monitor 123 which is common to the reflecting member 126 is arranged under the DVD/CD compatible objective lens 119 and the BD objective lens 108.

As explained above, as shown in FIGS. 6a, b, the front monitor optical system of the present invention has adopted a construction whereby the light receiving surface 129 of one front monitor 123 is arranged in the vicinity of the center of the light intensity distribution in the direction (θ//direction) perpendicular to the direction (hereinafter referred to as "θ⊥direction") horizontal to the chip activating layer of the two-wavelength multilaser 111 and the reflecting member 126 is caused to reflect the light of the intensity distribution at a place away from the center of the light intensity distribution in the direction (θ⊥direction) perpendicular to the chip activating layer of the BD laser light source 101 so as to guide the BD laser light to the light receiving surface 129 of one front monitor 123. The reason that such a front monitor optical system construction has been adopted will be explained below.

The two-wavelength multilaser 111 is currently made to have high output (on the order of 200 mW to 250 mW) at a volume production level and has a characteristic that the light intensity distribution at a place away from the center fluctuates considerably as the laser output power increases. Therefore, if the light intensity distribution at a place away from the center is used, the light intensity which is introduced to the front monitor 123 fluctuates considerably as the laser output power increases (the light intensity which is introduced to the front monitor 123 should originally increase linearly as the laser output power increases), which results in a disadvantage that it is no longer possible to control the light intensity of the light beam irradiated onto the information recording medium to a desired value. On the other hand, if the light intensity distribution near the center of the two-wavelength multilaser 111 is used as in the case of the present invention, the light intensity which is introduced to the front monitor 123 is stabilized even when the output power is increased (light intensity which is introduced to the front monitor 123 increases linearly), which results in an advantage that it is possible to control the light intensity of the light beam irradiated onto the information recording medium to a desired value accurately.

On the other hand, the BD laser light source 101 has present maximum output on the order of 130 mW to 160 mW at a volume production level, and moreover has characteristics that the maximum output is still low unlike the two-wavelength multilaser and that even if the laser output power is increased, the light intensity distribution at a place away from the center hardly fluctuates because of a characteristic of a laser. Therefore, as for the BD laser light source 101, even if the light of the intensity distribution at a place away from the center of the light intensity distribution in the direction (θ⊥direction) perpendicular to the chip activating layer is used, the light intensity which is introduced to the front monitor 123 increases linearly as the laser output power is increased and the light intensity which is introduced to the front monitor 123 is stabilized. Therefore, it is possible to control the light intensity of the light beam irradiated onto the information recording medium to a desired value accurately.

Adopting the front monitor optical system construction explained above allows light with three wavelengths to be introduced to one front monitor and has the effect of being able to save space of the optical pickup.

The construction and means for guiding light of the front monitor optical system according to this embodiment have been explained so far, and the front monitor optical system of this embodiment will be explained more specifically below with calculation examples using FIG. 9 to FIG. 17.

The BD objective lens 108 is an objective lens having a numerical aperture of 0.85 designed so that the optical performance becomes optimum in an intermediate layer of the information recording medium having a two-layer information record surface with an L0 layer of the BD (data protecting layer having a thickness of approximately 100 μm) and L1 layer (data protecting layer having a thickness of approximately 75 μm). The optical pickup is provided with the BD collimating lens 105 which introduces a light beam emitted from the BD laser light source 101 and transforms it into substantially parallel light and the collimating lens drive mechanism 109 and records/reproduces the L0 layer and L1 layer by translating the BD collimating lens 105 along the optical axis.

Figure 9:
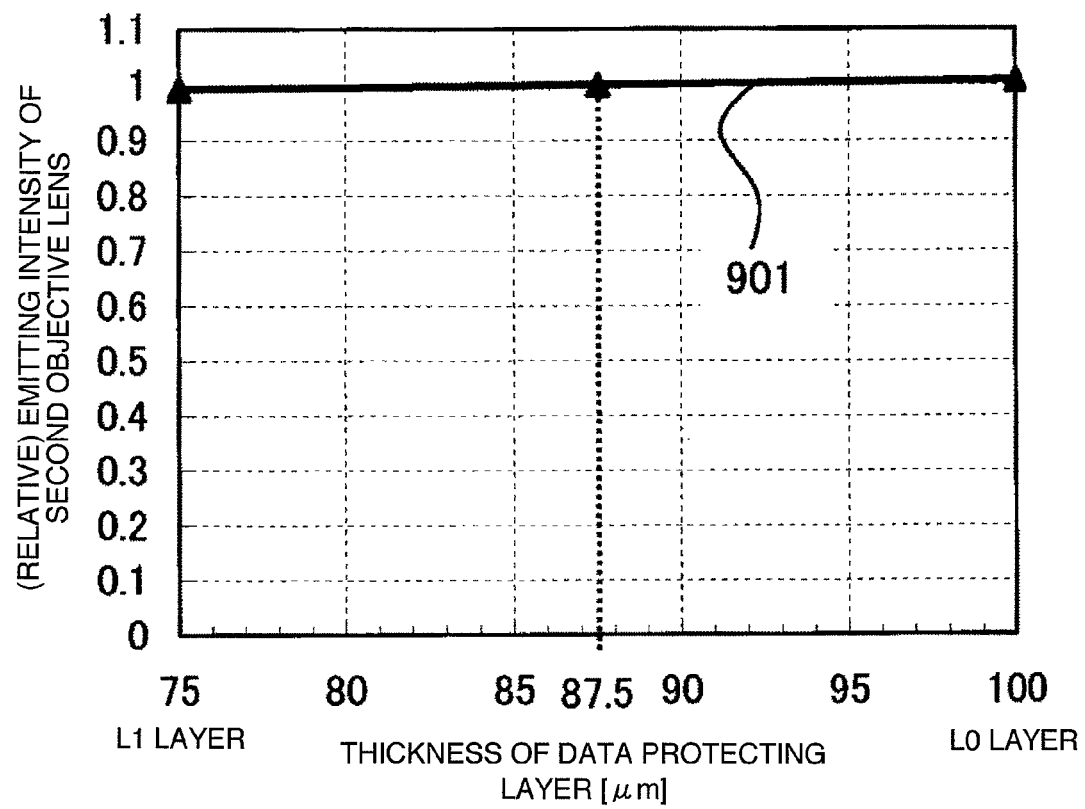
FIG. 9 is a graph plotting emitting intensity from a BD objective lens 108 in an L0 layer and an L1 layer in Embodiment 1.
Figure 10:
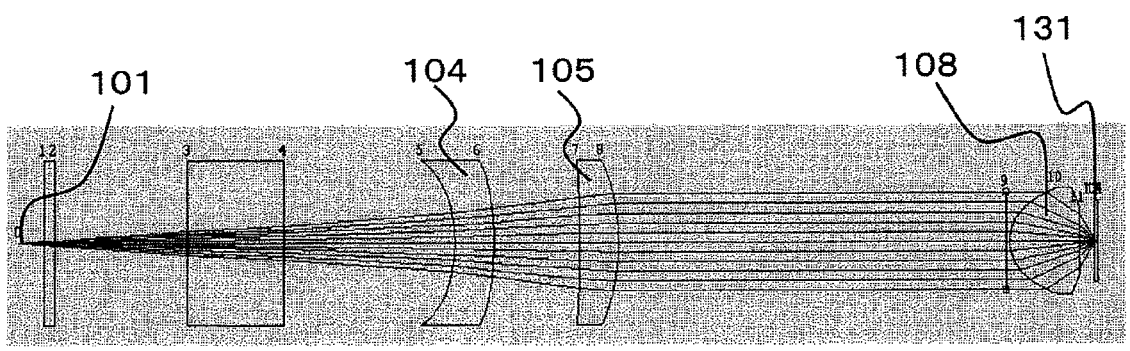
FIG. 10 shows a model for which optimization calculations of the BD objective lens 108, BD collimating lens 105 and auxiliary lens 104 in Embodiment 1 are carried out.

FIG. 9 is a graph obtained by calculating an emitting intensity from the BD objective lens 108 using beam tracking software and plotting the emitting intensity from the BD objective lens 108 in the L0 layer and the L1 layer assuming a case with a data protecting layer thickness of 87.5 μm as a reference (1). In this calculation, optimization calculations of the BD objective lens 108, BD collimating lens 105 and auxiliary lens 104 have been carried out using a model shown in FIG. 10 and using a commercially available beam tracking software.

It is appreciated from a characteristic curve 901 shown in FIG. 9 that the emitting intensity from the BD objective lens 108 is substantially equal for the L0 layer and L1 layer. Here, when a converted distance between surfaces (distance between surfaces converted to a length in air) from the BD collimating lens 105 to the BD objective lens 108 which is a second objective lens is expressed as L, the focal distance of the BD objective lens 108 is expressed as f0 and the focal distance of the BD collimating lens 105 is expressed as fcp, the above described L is set to approximately 5 to 7 times the above described f0 and the above described L is set to approximately 0.75 to 0.95 times the above described fcp.

Therefore, for one front monitor 123, the ratio of received light intensity of the front monitor 123 to the emitted light intensity of the BD objective lens 108 (hereinafter referred to as "FM sensitivity") is substantially the same for the L0 layer and the L1 layer, producing the effect of eliminating the necessity for such complicated means as changing the gain of the front monitor 123 between the L0 layer and the L1 layer.

Figure 11:
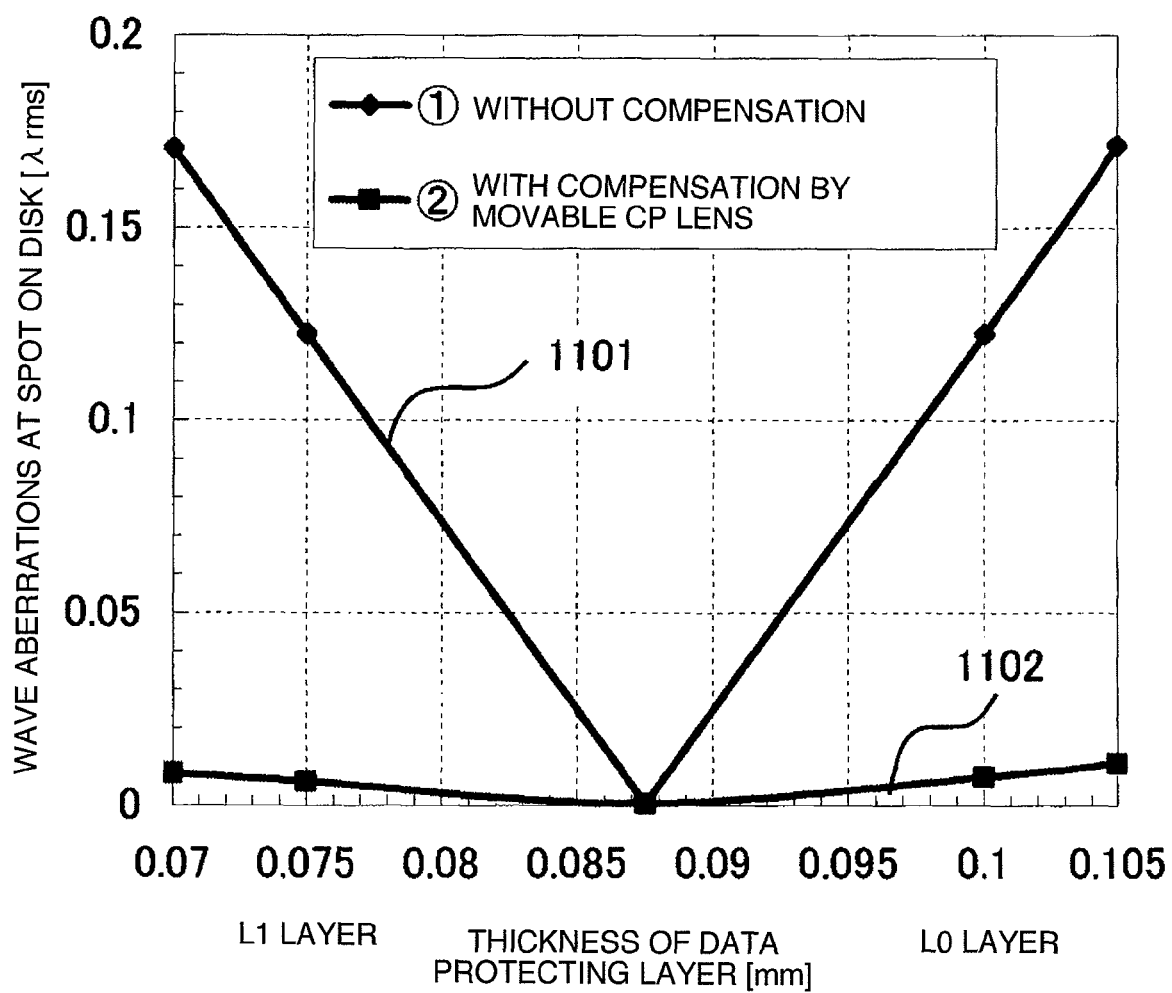
FIG. 11 is a graph showing calculated aberration of a light spot in a data layer (not shown) when spherical aberration in the BD optical system in Embodiment 1 is compensated.

FIG. 11 shows an example of aberration of a light spot in the data layer (not shown) calculated by setting the focal distance of the BD collimating lens 105 to 10 mm, moving the BD collimating lens 105 in the optical axis direction according to the thickness of the data protecting layer of the BD and compensating for a spherical aberration. When there is no compensation as shown with 1101, a light spot aberration goes beyond 0.15 λrms, while when there is compensation as shown with 1102, the light spot aberration is suppressed to 0.01 λrms or below and stable light spot quality is obtained. In this example, the allowable amount of movement of the BD collimating lens 105 required to move from an intermediate layer between the L0 layer and the L1 layer to the L0 layer, L1 layer is approximately ±0.3 mm.

Figure 12:
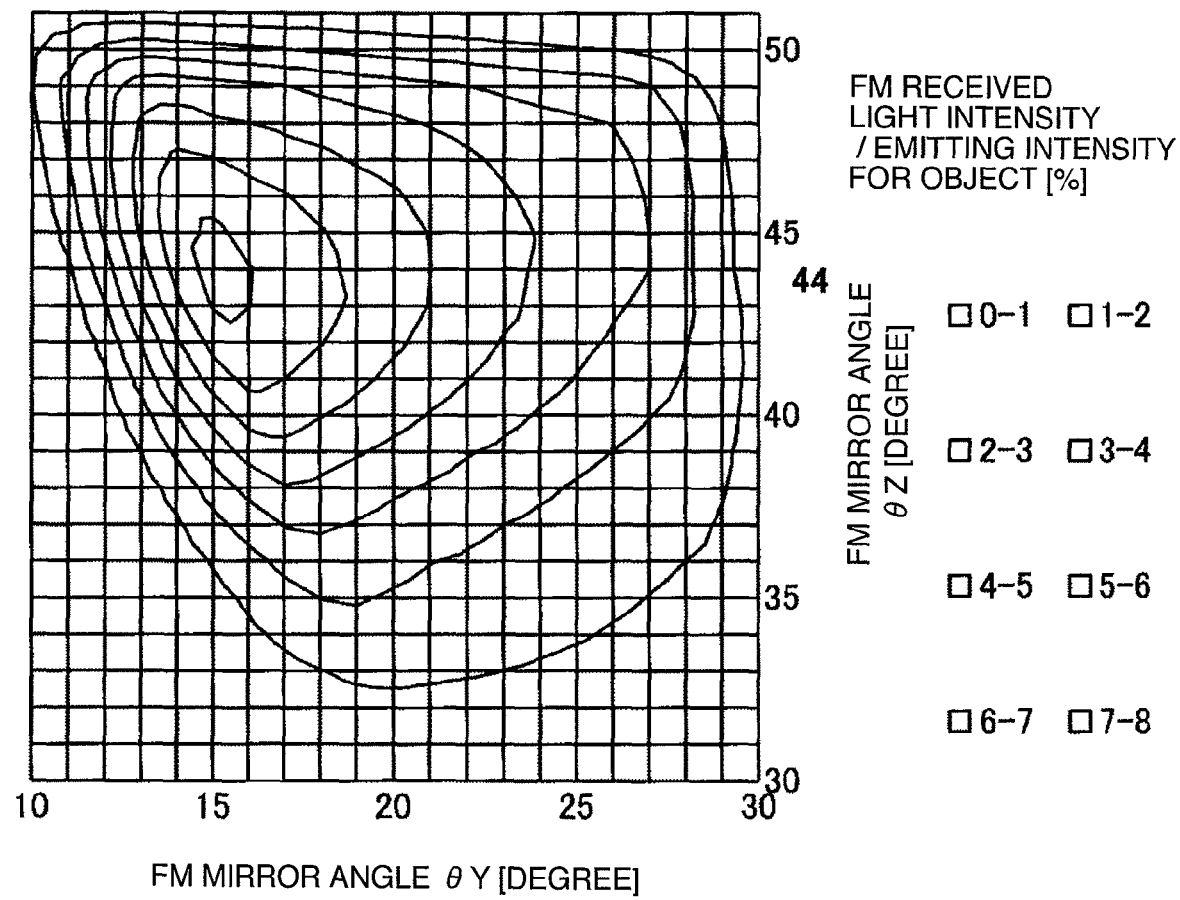
FIG. 12 is a contour graph showing an FM sensitivity distribution with the horizontal axis showing a setup angle $\theta Y$ of the reflecting member 126 and the vertical axis showing a setup angle $\theta Z$ in the L0 layer of BD in Embodiment 1.
Figure 13:
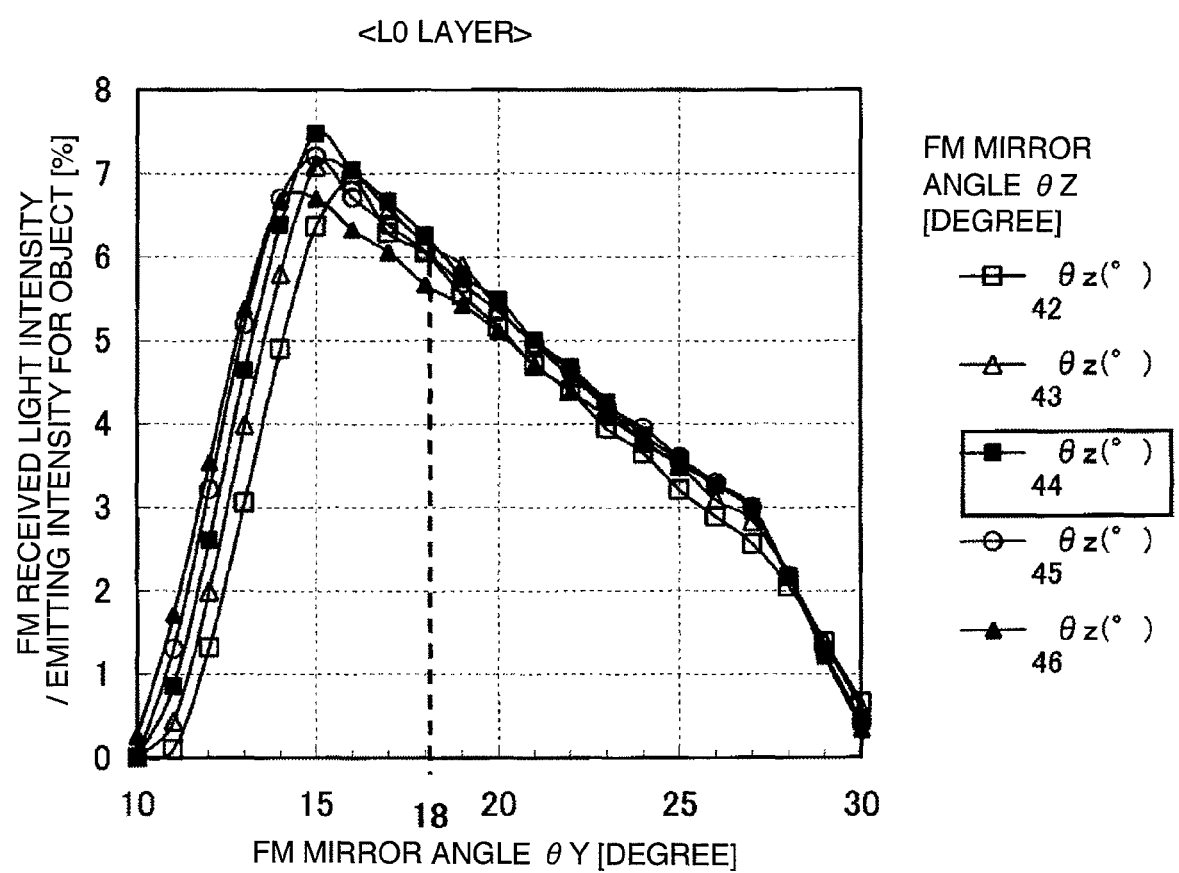
FIG. 13 is a graph showing FM sensitivity with the horizontal axis showing the setup angle $\theta Y$ and the vertical axis showing FM sensitivity using the setup angle $\theta Z$ as a parameter in the L0 layer of BD in Embodiment 1.

FIG. 12 and FIG. 13 show an example of FM sensitivity in the case of the L0 layer of the BD calculated for setup angles θZ, θY of the reflecting member 126 in the front monitor optical system explained using FIG. 4. FIG. 12 is a contour graph showing an FM sensitivity distribution with the horizontal axis showing the setup angle θY and the vertical axis showing the setup angle θZ. FIG. 13 is a graph with the horizontal axis showing the setup angle θY and the vertical axis showing FM sensitivity using the setup angle θZ as a parameter.

It is appreciated from this graph that FM sensitivity becomes a maximum (approximately 7.5%) when the setup angle θY of the reflecting member 126=approximately 15° and the setup angle θZ=approximately 44°. However, when θY=approximately 15° is assumed to be a design center value, the FM sensitivity varies sensitively with respect to a variation in the direction in which θY is smaller than 15°. A calculation of a light intensity distribution on the light receiving surface 129 of the front monitor 123 confirmed that this was attributable to the fact that light proceeds in a direction in which it is deflected on the light receiving surface 129. On the other hand, it is appreciated that when the setup angle θZ of reflecting member 126=approximately 44° is assumed to be a design center value, FM sensitivity to a variation is lower and more stable than in the setup angle θY direction. As shown above, when it is taken into consideration that FM sensitivity is kept as high as possible and the variation is suppressed as low as possible even if there is a variation (assuming approximately ±2°, for example) in the setup angle of the reflecting member 126, when the height of the reflecting mirror 103 is a nominal value, the setup angle θY of the reflecting member 126=approximately 17° and θZ=approximately 44° may be assumed to be the design center values. However, the height of the above described reflecting mirror 103 is well expected to actually vary on the order of 0.1 mm, and therefore when these variations are taken into consideration, it has been confirmed that FM sensitivity becomes less susceptible to a variation of the setup angle of the reflecting member 126 if the design center value of the setup angle θY of the reflecting member 126 is set to approximately 18°.

Figure 14:
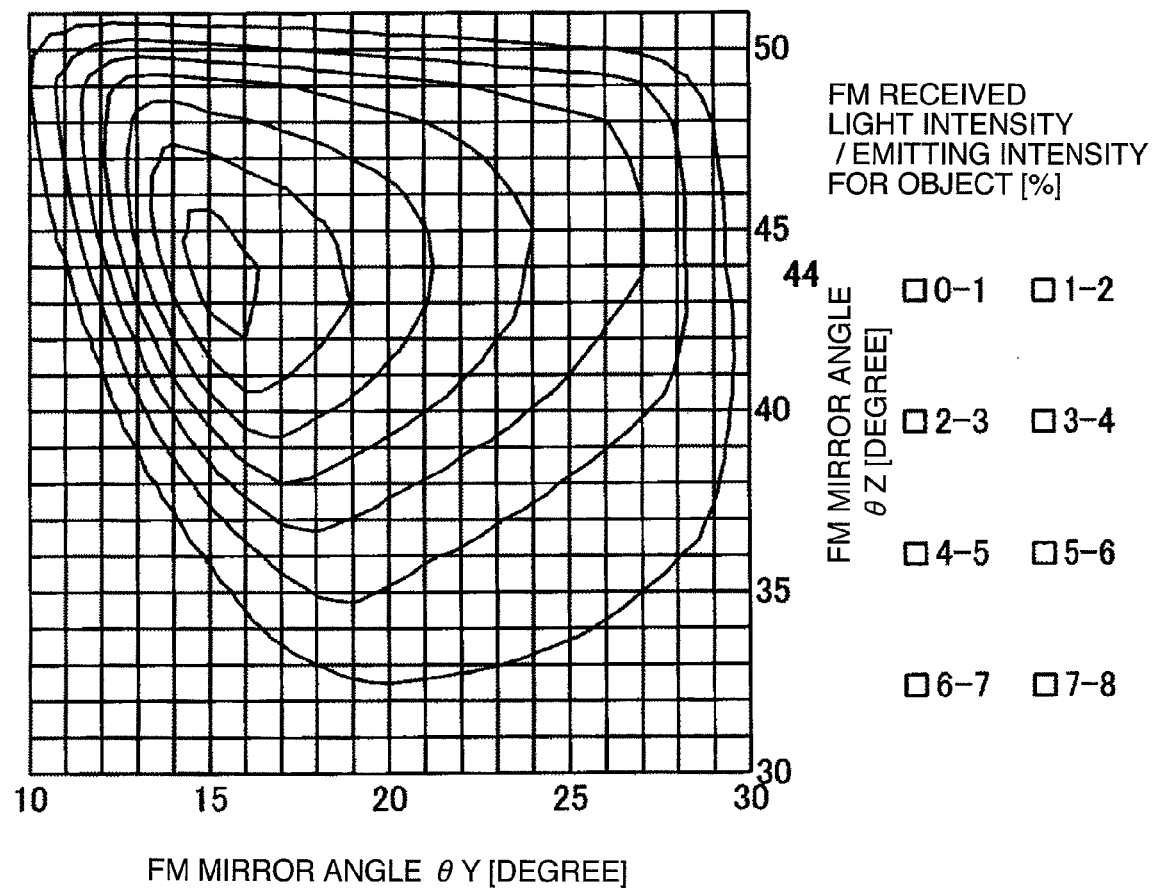
FIG. 14 is a contour graph showing an FM sensitivity distribution with the horizontal axis showing the setup angle $\theta Y$ of the reflecting member 126 and the vertical axis showing the setup angle $\theta Z$ in the L1 layer of BD in Embodiment 1.

FIG. 14 and FIG. 15 show an example of FM sensitivity in the case of the L1 layer of the BD calculated with respect to the setup angles θZ, θY of the reflecting member 126. FIG. 14 is a contour graph showing an FM sensitivity distribution with the horizontal axis showing the setup angle θY and the vertical axis showing the setup angle θZ. FIG. 15 is a graph with the horizontal axis showing the setup angle θY and the vertical axis showing FM sensitivity using a setup angle θZ as a parameter. The calculation result in FIG. 11 shows that the emitting intensity from the BD objective lens 108 is substantially equal for the L0 layer and the L1 layer, and this is reflected in the result proving that there is no significant difference. Therefore, explanations hereinafter will be based on the calculation result in the L0 layer.

Based on the calculation result of FIG. 12 and FIG. 13, when it was examined whether or not [Formula 3] explained above, that is, the relationship of P3×F03×K3<VS was satisfied, it was confirmed that the FM sensitivity must be reduced. Therefore, the examination shown in FIG. 16 was conducted. FIG. 16 shows an FM sensitivity calculation result when the setup angle θY of the reflecting member 126=approximately 18°, θZ=approximately 44° were set and the center line 302 of the light receiving surface 129 of the front monitor 123 was shifted from the BD optical axis 201 in the Z direction (which corresponds to the θ⊥direction perpendicular to the chip activating layer of the BD laser light source 101). The horizontal axis shows a shifted quantity in the θ⊥ direction (Z direction) and the vertical axis shows FM sensitivity. Here, sign "+" of the shifted quantity in the θ⊥direction (Z direction) shows the direction in which it approaches the information recording medium 131 and sign "−" shows the direction in which it goes away from the information recording medium 131. Based on the result of this characteristic curve 1601, when it was examined again whether [Formula 3], that is, the relationship of P3×F03×K3<VS was satisfied, the shifted quantity in the θ⊥direction (Z direction) was set to approximately +1.2 mm (+side was set due to restrictions on the arrangement in the height direction) and further the reflection coefficient of the reflecting surface 401 of the reflecting member 126 was set to 50% or below, that is, FM sensitivity was set to approximately 1.5% or below, it was confirmed that [Formula 3] above, that is, the relationship of P3×F03×K3<VS was satisfied. When the above described processes are summarized, using a plurality of means: (1) the setup angle of the reflecting member 126 is set to θZ=approximately 44°, θY=approximately 18°, (2) the center line 302 of the light receiving surface 129 of one front monitor 123 is shifted by approximately 1.2 mm upward from the BD optical axis 201. (Δ=approximately +1.2 mm in FIG. 2), (3) the reflection coefficient of the reflecting surface 401 of the reflecting member 126 is set to 50% or below, it has been made possible to cause an appropriate light intensity that the drive voltage of the front monitor 123 in the BD optical system is not saturated to be introduced to the light receiving surface 129.

Figure 17A:
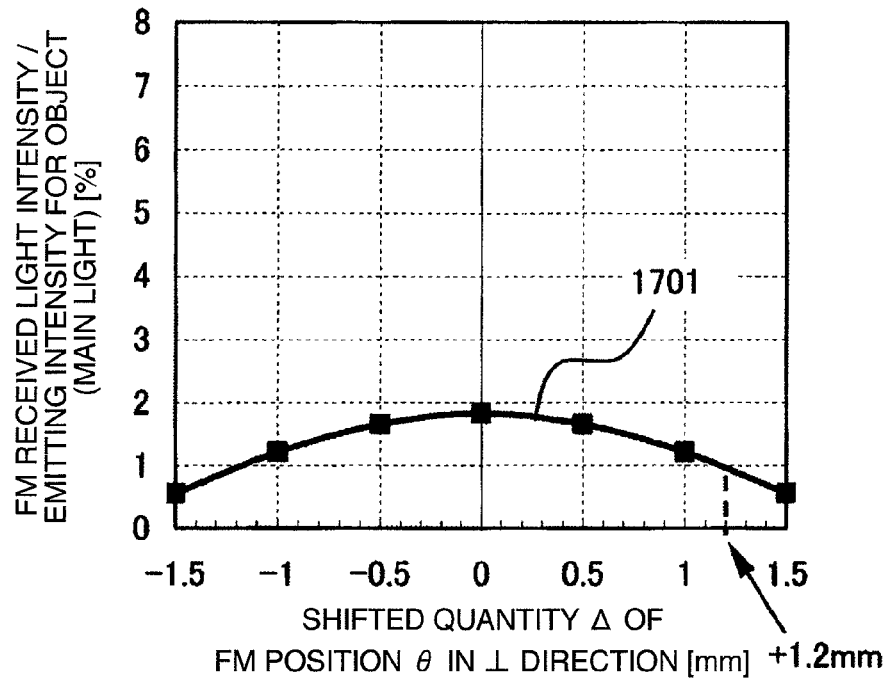
FIGS. 17a and 17b are graphs showing an FM sensitivity calculation result when the center line 302 of the light receiving surface 129 of the front monitor 123 is shifted in the Z direction from the optical axis 301 of the light emitted from a two-wavelength multilaser 111 on the horizontal axis of a DVD, CD in Embodiment 1.
Figure 17B:
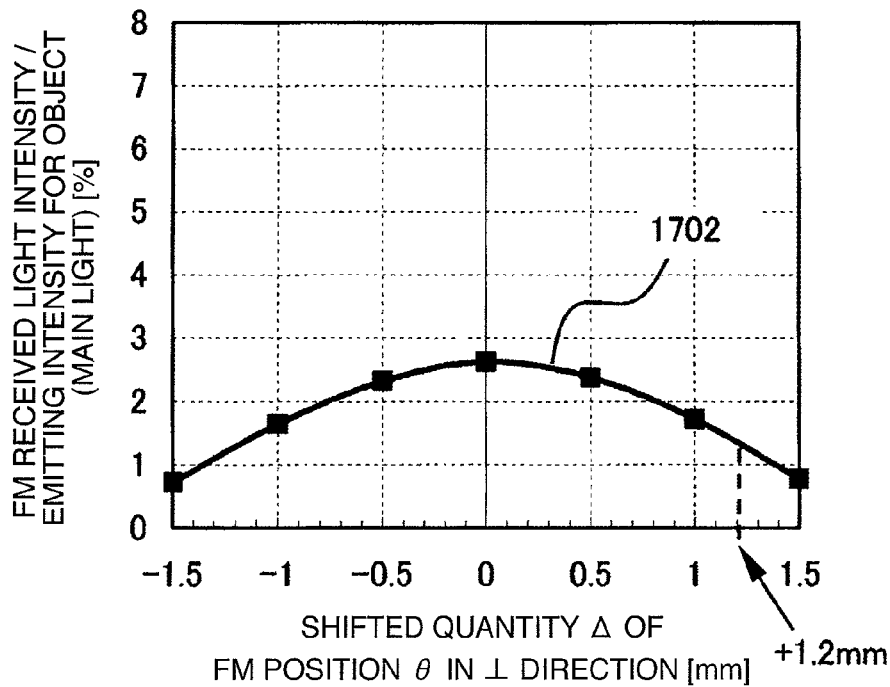

FIGS. 17a, b show an example of FM sensitivity calculated in a DVD and a CD respectively, with the horizontal axis showing an FM sensitivity calculation result when shifting the center line 302 of the light receiving surface 129 of the front monitor 123 from the optical axis 301 of the light emitted from the two-wavelength multilaser 111 in the Z direction (which corresponds to the θ⊥direction of the chip activating layer of the two-wavelength multilaser 111 and this embodiment sets the same height for the BD optical axis 201 and the optical axis 301). The horizontal axis shows a shifted quantity in the θ⊥direction (Z direction) and the vertical axis shows FM sensitivity. Here, the sign "+" of the shifted quantity in the θ⊥direction (Z direction) indicates the direction of approaching the information recording medium 131 and the sign "−" indicates the direction of moving away from the information recording medium 131. Based on the result of characteristic curves 1701, 1702, when it was examined whether or not [Formula 1] above, that is, P1×F01×K1<VS and [Formula 2], that is, the relationship of P2×F02×K2<VS was satisfied, the result showed that using the means of setting a shifted quantity in the θ⊥direction (Z direction) to approximately +1.2 mm which is the same as that of the BD optical system (in FIG. 3, Δ=approximately +1.2 mm), if FM sensitivity in the DVD is set to approximately 1% and FM sensitivity in the CD is set to approximately 1.5%, it was appreciated that [Formula 1], that is, P1×F01×K1<VS and [Formula 2], that is, the relationship of P2×F02×K2<VS was satisfied and it was possible to cause an appropriate light intensity for which the drive voltage of the front monitor 123 in the DVD, CD was not saturated to be introduced to the light receiving surface 129. Furthermore, based on the above described examination result, when the ratio of the focal distance of the collimating lens 115 which is the first collimating lens system to the focal distance of the DVD/CD compatible objective lens 119 which is the first objective lens is expressed as M1 and the ratio of the combined focal distance of the auxiliary lens 104 which is the second collimating lens system and the BD collimating lens 105 to the focal distance of the BD objective lens 108 which is the second objective lens is expressed as M2, it has been appreciated that the common front monitor 123 can be used by setting the ratio of the above described M1 and M2 to substantially 1:2 and setting the FM sensitivity of the BD, DVD and CD with three wavelengths to substantially the same value.

Therefore, it is possible to obtain the effect of enabling an appropriate light intensity for three wavelengths of the BD, DVD and CD to be introduced to the light receiving surface of the front monitor by improving the means and construction for guiding light to the three-wavelength front monitor whose light receiving sensitivity has different characteristics depending on the wavelength of the incident light. As a result, it is possible to obtain the effect of being able to share one front monitor with three wavelengths in the BD/DVD/CD optical systems and providing a thin, small optical pickup designed for space saving. Furthermore, it is also possible to obtain the effect of using an economic, flat-shaped mirror, requiring only one front monitor, adopting a construction with no additional parts and thereby providing an advantage on the cost front. The above described means and construction are also applicable to an optical pickup compatible with a half-height drive built in or external to a desktop computer.

Embodiment 2

Figure 18:
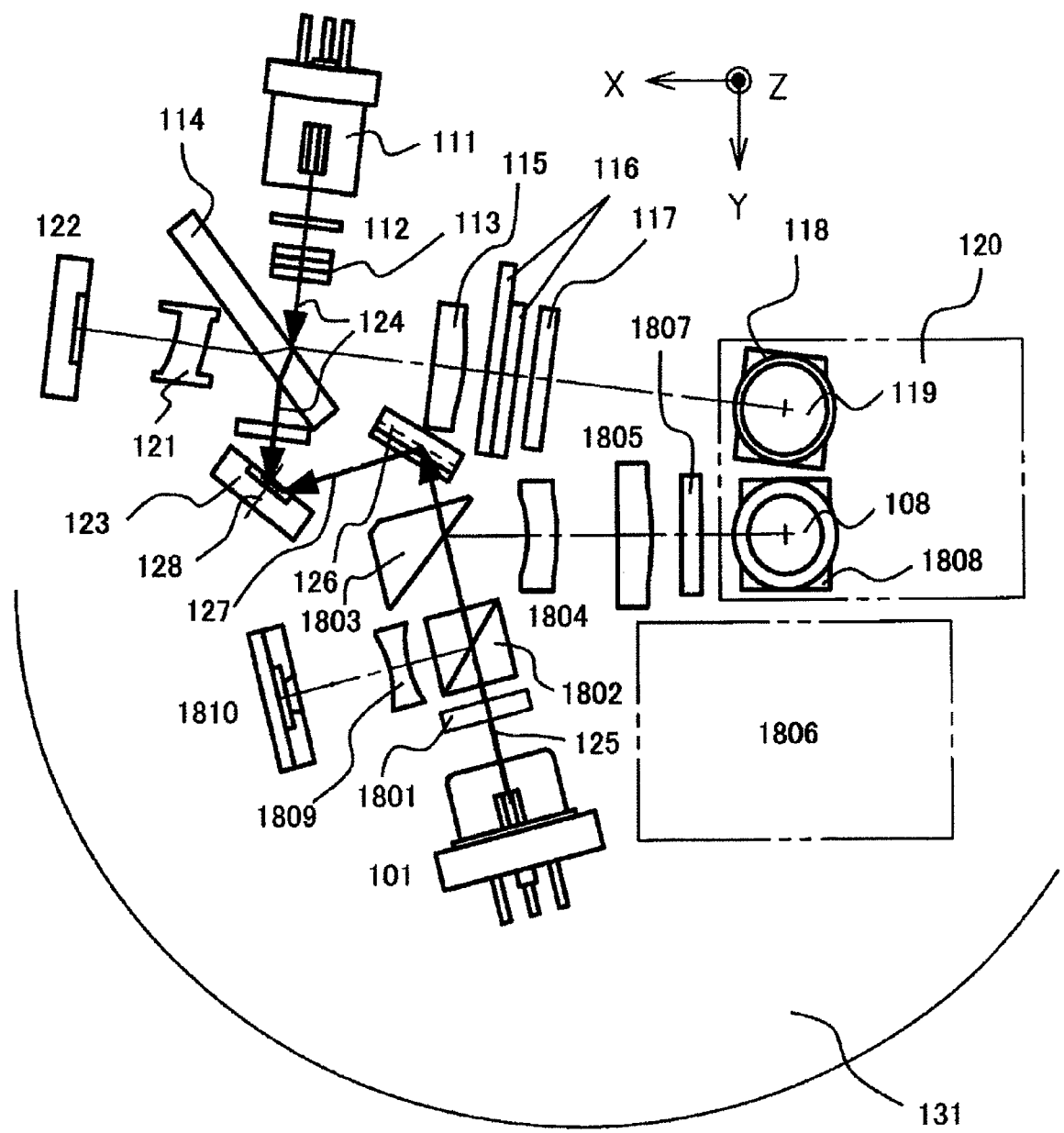
FIG. 18 is a top view showing an outline of an optical pickup corresponding to a BD, DVD and CD in Embodiment 2.

Embodiment 2 of the present invention will be explained using FIG. 18. FIG. 18 is a top view showing an outline of a low-profile optical pickup compatible with a BD, DVD and CD. First, the optical system of the BD will be explained. A light beam of linearly polarized light in wavelength approximately 405 nm band from a BD laser light source 101 is emitted as divergent light. The light beam emitted from the BD laser light source 101 is introduced to a BD diffraction grating 1801. The BD diffraction grating 1801 causes the light beam to be branched into one main light beam and two sub light beams. The two sub light beams are used to generate a tracking error signal (hereinafter, referred to as TES) based on a DPP and a focus error signal (hereinafter, referred to as FES) based on a differential astigmatic detection scheme (DAD). DPP and DAD are publicly known techniques, and therefore explanations thereof will be omitted here.

After passing through a polarization beam splitter 1802, the light beam which has passed through the BD diffraction grating 1801 is reflected by a reflecting mirror 1803 and introduced to an auxiliary lens 1804. The light beam which has passed through the auxiliary lens 1804 is transformed into a substantially parallel light beam by a BD collimating lens 1805. A drive mechanism 1806 of the BD collimating lens 1805 (area enclosed by a two-dot dashed line) drives the BD collimating lens 1805 in a direction parallel to the light beam introduced to the BD collimating lens 1805 (X direction). The surface of the BD collimating lens 1805 is provided with a diffraction groove to compensate for a chromatic aberration caused by a momentary wavelength variation of the BD laser light source 101. The light beam which has passed through the BD collimating lens 1805 is introduced to a BD ¼ wave plate 1807 and transformed into circularly polarized light. The light beam which has passed through the BD ¼ wave plate 1807 is reflected in the Z direction by a BD raising mirror 1808, introduced to a BD objective lens 108 and condensed and irradiated onto an information recording medium 131 or data layer (not shown) of the BD here.

The light beam reflected by the data layer (not shown) passes through the BD objective lens 108, BD raising mirror 1808, BD collimating lens 1805, auxiliary lens 1804, reflecting mirror 1803, polarization beam splitter 1802, BD detection lens 1809, and reaches a BD light detector 1810. The BD detection lens 1809 is made up of a columnar lens and a spherical lens and when the light beam passes through the BD detection lens 1809, it is given predetermined astigmatism in a direction of approximately 45 degrees and used to detect FES. This BD detection lens 1809 has the function of rotating the orientation of astigmatism in an arbitrary direction and at the same time determining the size of a condensing spot on the BD light detector 1810. The light beam guided to the BD light detector 1810 is used to detect an information signal recorded in the data layer (not shown) of the BD and detect a position control signal of the light spot irradiated onto an optical disk such as TES and FES. As in the case of Embodiment 1, when a general semiconductor laser is used and the emitted light beam thereof is not shaped, an outward path magnification is preferably set to approximately 5 times to 7 times for the DVD, while it is preferably set to approximately 10 times to 14 times for the BD and this embodiment also sets the outward path magnification within these ranges. As in the case of Embodiment 1, as the means for converting the light beam incident upon the BD objective lens 108 from a parallel to weakly divergent or weakly convergent beam to compensate for a spherical aberration, this embodiment provides the BD collimating lens drive device 1806 and moves the BD collimating lens 1805 in the optical axis direction. Furthermore, as in the case of Embodiment 1, the focal distance of the BD collimating lens 1805 is preferably set to a range on the order of 9 to 12 mm and this embodiment also sets the focal distance of the BD collimating lens 1805 to this range.

Since the optical system of the DVD, CD is the same as Embodiment 1, explanations thereof will be omitted here. Moreover, since a front monitor optical system is also the same as that of Embodiment 1, explanations thereof will be omitted here. As the detection scheme of the BD optical system, even when this optical system is changed to an optical system using a differential astigmatism method for FES and DPP for TES, the effect obtained about the front monitor optical system is the same as that of Embodiment 1.

Embodiment 3

Embodiment 3 of the present invention will be explained using FIG. 19 to FIG. 21. An overall construction of each optical system of a BD, DVD and CD will be explained first and then the front monitor optical system which is a main part of the present invention will be explained.

Figure 19:
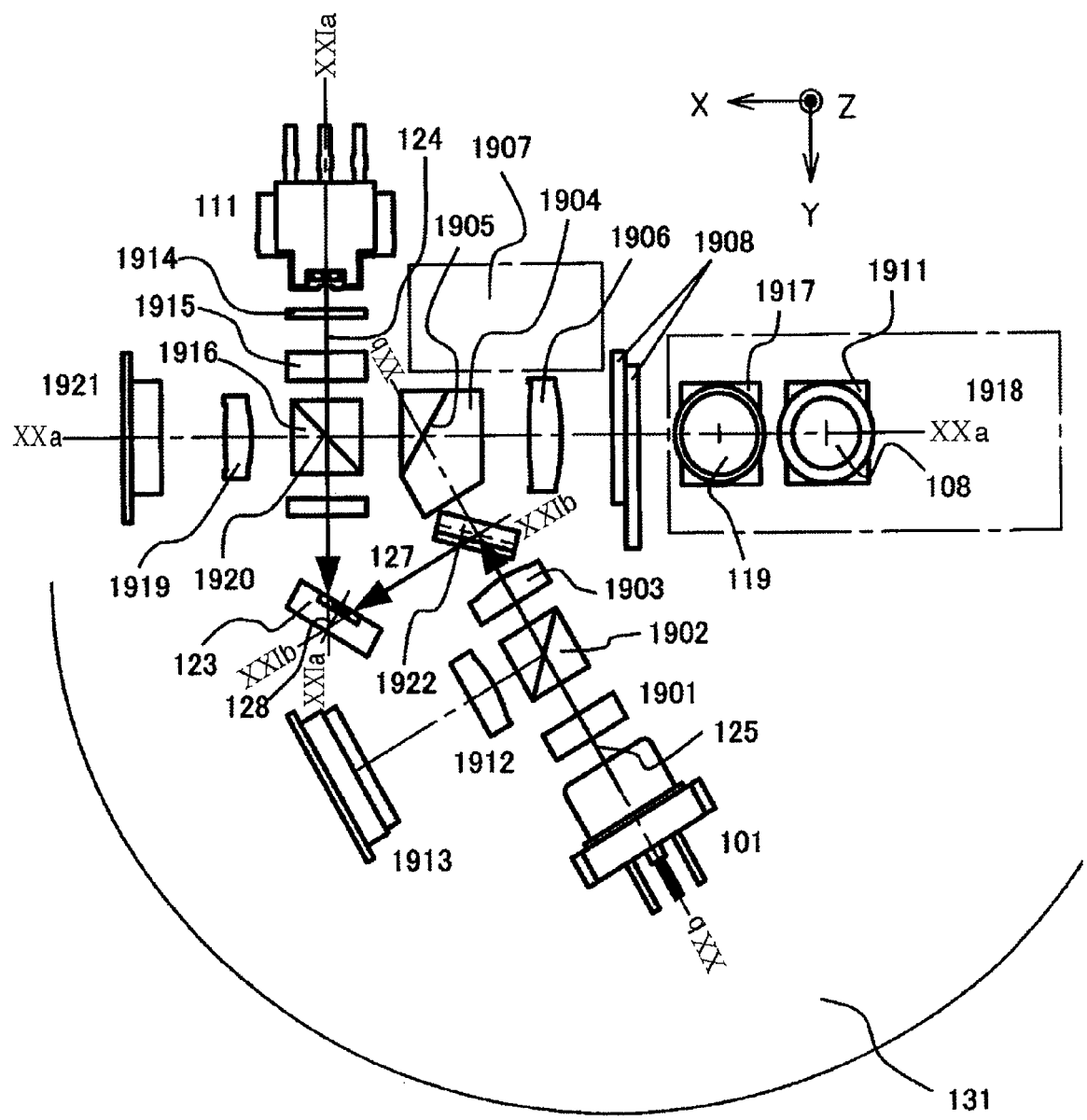
FIG. 19 is a top view showing an outline of an optical pickup corresponding to a BD, DVD and CD in Embodiment 3.
Figure 20A:
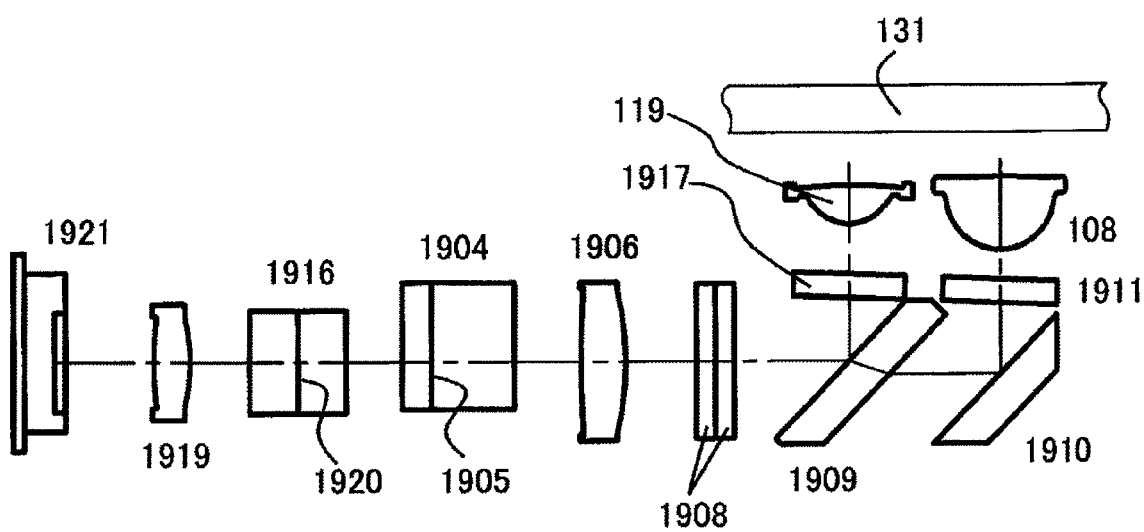
FIGS. 20a and 20b show an A-A section and a B-B section of FIG. 19.
Figure 20B:
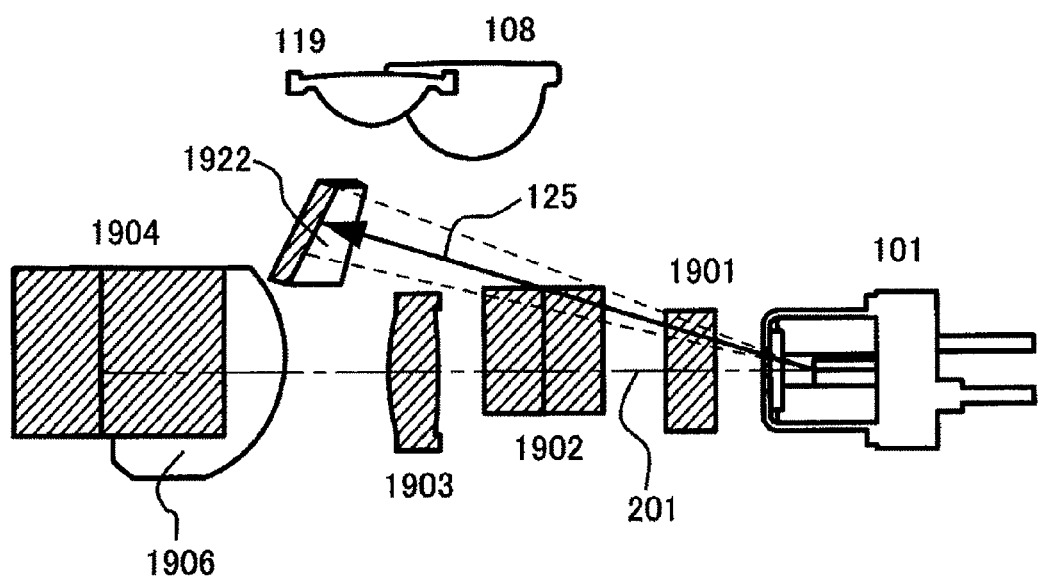
Figure 21A:
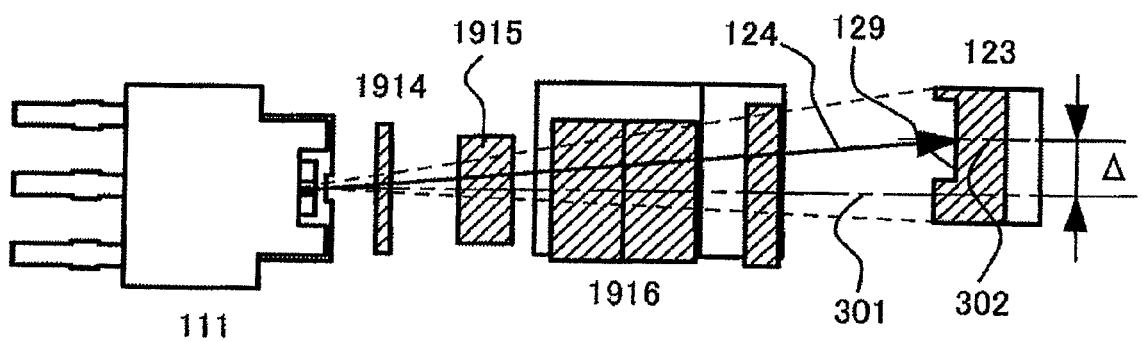
FIGS. 21a and 21b show a C-C section and a D-D section of FIG. 19.
Figure 21B:
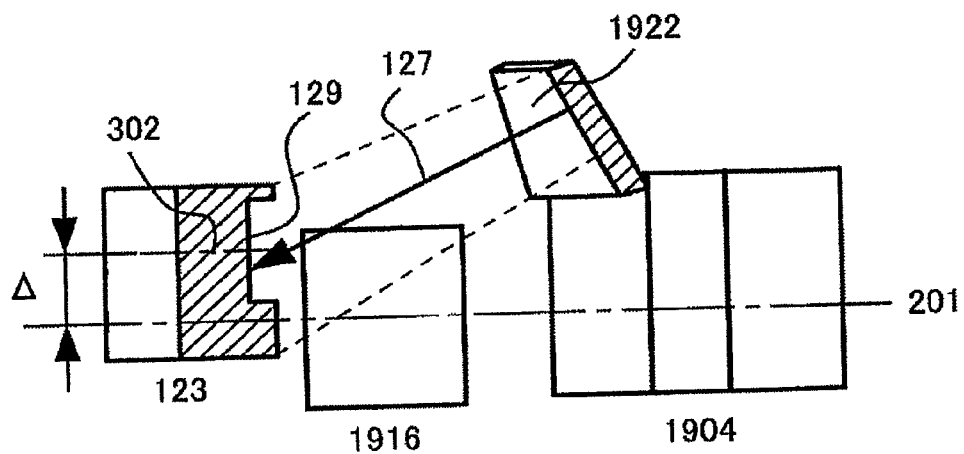

FIG. 19 is a top view showing an outline of a low-profile optical pickup compatible with a BD, DVD and CD, FIG. 20a shows an A-A section of FIG. 19, FIG. 20b shows a B-B section of FIG. 19, FIG. 21a shows a C-C section, which corresponds to section XXIa, of FIG. 19 and FIG. 21b shows a D-D section, which corresponds to section XXIb, of FIG. 19. Embodiment 1 and Embodiment 2 have shown examples of an optical pickup with BD and DVD/CD optical systems which are independent of each other, but this embodiment is different from Embodiment 1 and Embodiment 2 in that the optical paths of the optical systems of the BD and DVD/CD are made to be common from some midpoint. The BD optical system will be explained below first. A light beam of linearly polarized light in wavelength approximately 405 nm band is emitted from a BD laser light source 101 as divergent light. The light beam emitted from the BD laser light source 101 is introduced to a BD diffraction grating (1901). The special BD diffraction grating 1901 branches the light beam into one main light beam and four sub light beams. These light beams are used to generate a tracking error signal (hereinafter referred to as "TES") based on a five-spot scheme and a focus error signal (hereinafter referred to as "FES") using an astigmatism method. The astigmatism method and the five-spot scheme are publicly known techniques, and therefore explanations thereof will be omitted. The light beam which has passed through the BD special diffraction grating 1901 passes through a polarization beam splitter 1902 and then introduced to a BD auxiliary lens 1903, reflected by a reflecting surface 1905 of a three-wavelength compatible prism 1904, introduced to a common collimating lens 1906 and transformed into a substantially parallel light beam. A drive mechanism 1907 (area enclosed by a two-dot dashed line) of the common collimating lens 1906 drives the common collimating lens 1906 in a direction parallel to the light beam incident upon the common collimating lens 1906 (X direction). The light beam which has passed through the common collimating lens 1906 passes through a liquid crystal aberration compensating element 1908, a DVD/CD raising mirror 1909, is reflected in the Z direction by a BD raising mirror 1910, introduced to a BD ¼ wave plate 1911 and transformed into circularly polarized light. The light beam is then introduced to a BD objective lens 108 and condensed and irradiated onto an information recording medium 131 or a data layer (not shown) of the BD here. The three-wavelength compatible prism 1904, common collimating lens 1906, liquid crystal aberration compensating element 1908 and DVD/CD raising mirror 1909 are optical elements common to three wavelengths of the BD, DVD and CD. The above described liquid crystal aberration compensating element 1908 does not act on BD light and lets it pass. A chromatic aberration compensating element (not shown) is pasted to the BD ¼ wave plate 1911 to compensate for a chromatic aberration caused by a momentary wavelength variation of the BD laser light source 101. Furthermore, when the L0 layer and L1 layer which are data layers (not shown) of the BD is recorded/ reproduced, weakly divergent light or weakly convergent light is introduced to the DVD/CD raising mirror 1909, whose amount of astigmatism or coma aberration produced at this time was calculated and the result showed a level without any problem.

The light beam reflected by the data layer (not shown) passes through the BD objective lens 108, BD ¼ wave plate 1911, BD raising mirror 1910, DVD/CD raising mirror 1909, liquid crystal aberration compensating element 1908, common collimating lens 1906, reflecting surface 1905 of three-wavelength compatible prism 1904, BD auxiliary lens 1903, polarization beam splitter 1902, BD detection lens 1912 and reaches a BD light detector 1913. The BD detection lens 1912 is made up of a columnar lens and a spherical lens and when the light beam passes through the BD detection lens 1912, it is given predetermined astigmatism in a direction of approximately 45 degrees and is used to detect FES. This BD detection lens 1912 has the function of rotating the orientation of astigmatism in an arbitrary direction and at the same time determining the size of a condensing spot on the BD light detector 1913. The light beam guided to the BD light detector 1913 is used to detect an information signal recorded in the data layer (not shown) of the BD and detect a position control signal of a light spot irradiated onto an optical disk such as TES and FES. When a general semiconductor laser is used and the emitted light beam thereof is not shaped, an outward path magnification may be set to approximately 10 times to 14 times and this embodiment also sets the outward path magnification within this range.

Next, the DVD/CD optical system will be explained hereinafter. Reference numeral 111 denotes a two-wavelength multilaser and is a laser light source which incorporates two laser chips which emit light beams of different wavelengths inside a casing thereof. The two-wavelength multilaser 111 is provided with a DVD laser chip (not shown) which emits a light beam of wavelength approximately 660 nm and a CD laser chip (not shown) which emits a light beam of wavelength approximately 780 nm. The DVD optical system will be explained first.

The DVD laser chip (not shown) of the two-wavelength multilaser 111 emits a DVD light beam of linearly polarized light as divergent light. The light beam emitted from the DVD laser chip (not shown) is introduced to a wideband ½λ wave plate 1914 and transformed into light linearly polarized in a predetermined direction. When light beams in wavelength approximately 660 nm band and wavelength approximately 780 nm are introduced, the wideband ½λ wave plate 1914 is an element which functions as a ½λ wave plate for both wavelengths and is commonly used for a DVD/CD compatible optical pickup currently in use. The light beam is then introduced to a wavelength selective diffraction grating 1915. This wavelength selective diffraction grating 1915 is an optical element which branches, when a light beam of wavelength approximately 660 nm is introduced, the light beam at a diffraction angle θA and branches, when a light beam of wavelength approximately 780 nm, the light beam at a diffraction angle θB. Such a wavelength selective diffraction grating 1915 can be manufactured by improving the groove depth and the refractive index of the diffraction grating and is used for an optical pickup mounted with a two-wavelength multilaser light source in recent years. The light beam is branched into one main light beam and two sub light beams by the wavelength selective diffraction grating 1915 and the two sub light beams are used to generate signals based on DPP or differential astigmatic detection scheme (DAD). The DPP and DAD are publicly known techniques, and therefore explanations thereof will be omitted. After passing through the wavelength selective diffraction grating 1915, the light beam is reflected by a reflecting surface 1920 of a dichroic half prism 1916, passes through the three-wavelength compatible prism 1904 and is transformed into a substantially parallel light beam by the common collimating lens 1906. The above described dichroic half prism 1916 has the functions of letting pass a part (e.g., approximately 10%) of the light beam emitted from the two-wavelength multilaser 111 and reflecting the remaining approximately 90% of the light beam and guiding it to the DVD/CD compatible objective lens 119. Furthermore, the focal distance of the above described common collimating lens 1906 is set so that an outward path magnification of the DVD or CD becomes approximately 5 to 7 times. The light beam which has proceeded through the common collimating lens 1906 is introduced to the liquid crystal aberration compensating element 1908. This liquid crystal aberration compensating element 1908 does not act on the BD light and has the function of compensating for a coma aberration in a predetermined direction for the light beam of the DVD. An electrode pattern as shown in FIG. 5 is designed for the light beam of the CD so as to be able to compensate for a coma aberration in the same way as for the DVD though the compensation quantity is different. The light beam which has passed through the liquid crystal aberration compensating element 1908 is reflected in the Z direction by the DVD/CD raising mirror 1909, introduced to the wideband ¼λ wave plate 1917 and transformed into circularly polarized light. The wideband ¼λ wave plate 1917 is an optical element which functions as the ¼λ wave plate for both the DVD and CD light beams. The light beam is then introduced to the DVD/CD compatible objective lens 119 and condensed and irradiated onto the information recording medium 131 or a data layer (not shown) of the DVD here. The DVD/CD compatible objective lens 119 and BD objective lens 108 are mounted on the objective lens actuator 1918 enclosed by a two-dot dashed line and can be driven to perform translation in the Y direction and Z direction and rotation around the X axis in the figure.

The light beam reflected by the data layer (not shown) passes through the DVD/CD compatible objective lens 119, wideband ¼λ wave plate 1917, DVD/CD raising mirror 1909, liquid crystal aberration compensating element 1908, common collimating lens 1906, three-wavelength compatible prism 1904, dichroic half prism 1916, detection lens 1919 and reaches a light detector 1921. The detection lens 1919 is made up of a columnar lens and a spherical lens and when the light beam passes through the detection lens 1919, it is given predetermined astigmatism in a direction of approximately 45 degrees and is used to detect FES. This detection lens 1919 has the function of rotating the orientation of astigmatism in an arbitrary direction and at the same time determining the size of a condensing spot on the light detector 1921. The light beam guided to the light detector 1921 is used to detect an information signal recorded in the data layer (not shown) of the DVD and detect a position control signal of a light spot condensed and irradiated onto the data layer of the DVD such as TES and FES. Here, the upper side of FIG. 19 corresponds to the direction of the internal circumference of the information recording medium 131 and the under side corresponds to the direction of the outer circumference of the information recording medium 131. The two objective lenses; DVD/CD compatible objective lens 119 and BD objective lens 108 are juxtaposed to each other in the tangential direction of the information recording medium 131, but when the optical pickup is manufactured, the respective optimum tilt angles of the DVD/CD compatible objective lens 119 and the BD objective lens 108 may differ depending on the radial direction and the tangential direction of the information recording medium 131. The liquid crystal aberration compensating element 1908 is mounted to compensate for the difference in this optimum tilt angle. Since the difference in the tilt angle corresponds to a coma aberration, the liquid crystal aberration compensating element 1908 has the function of compensating for a coma aberration of the information recording medium 131 in the radial direction and the tangential direction.

Next, the CD optical system will be explained. A CD light beam of linearly polarized light is emitted as divergent light from a CD laser chip (not shown) of the two-wavelength multilaser 111. The light beam emitted from the CD laser chip (not shown) is introduced to the wideband ½λ wave plate 1914 and is transformed into light linearly polarized in a predetermined direction. The light beam is then introduced to the wavelength selective diffraction grating 1915, branched into one main light beam and two sub light beams at a diffraction angle θB which is different from the above described diffraction angle θA and the two sub light beams are used to generate signals of DPP and DAD. The light beam which has passed through the wavelength selective diffraction grating 1915 is reflected by the reflecting surface 1920 of the dichroic half prism 1916, passes through the three-wavelength compatible prism 1904 and transformed into a substantially parallel light beam by the collimating lens 1906. The light beam which has passed through the collimating lens 1906 is introduced to the liquid crystal aberration compensating element 1908. The liquid crystal aberration compensating element 1908 has the function of compensating for a coma aberration in a predetermined direction for the light beam of the CD, too. The light beam which has passed through the liquid crystal aberration compensating element 1908 is reflected in the Z direction by the DVD/CD raising mirror 1909, introduced to the wideband ¼ wave plate 1917 and transformed into circularly polarized light. The light beam which has passed through the wideband ¼ wave plate 1917 is introduced to the DVD/CD compatible objective lens 119 and condensed and irradiated onto the data layer (not shown) of the CD.

The light beam reflected by the data layer (not shown) of the CD passes through the DVD/CD compatible objective lens 119, wideband ¼λ wave plate 1917, DVD/CD raising mirror 1909, liquid crystal aberration compensating element 1908, collimating lens 1906, three-wavelength compatible prism 1904, dichroic half prism 1916, detection lens 1919 and reaches the light detector 1921. The detection lens 1919 is made up of a columnar lens and a spherical lens, and when the light beam passes through the detection lens 1919, it is given predetermined astigmatism in a direction of approximately 45 degrees and is used to detect FES. This detection lens 1919 has the function of rotating the orientation of astigmatism in an arbitrary direction and at the same time determining the size of a condensing spot on the light detector 1921. The light beam guided to the light detector 1921 is used to detect an information signal recorded in the data layer (not shown) of the CD and detect a position control signal of the light spot condensed and irradiated onto the data layer of the CD such as TES and FES.

The front monitor optical system of this embodiment will be explained. First, the front monitor optical system of the BD will be explained. A reflecting member 1922 is arranged tilted at different angles around the Y axis and Z axis in FIG. 19 in an upper space between the three-wavelength compatible prism 1904 and BD auxiliary lens 1903 as in the case of Embodiment 1 so as to guide light emitted from the BD laser light source 101 to a light receiving surface 129 of one front monitor 123. The front monitor optical system of the DVD and CD is the same as that in Embodiment 1, and therefore explanations thereof will be omitted here. Furthermore, considering the difference in transmissivity of optical parts with respect to Embodiment 1, by conducting similar examinations as those in Embodiment 1, it is possible to satisfy the relationship of [Formula 1], that is, P1×F01×K1<VS and [Formula 2], that is, P2×F02×K2<VS and [Formula 3], that is, P3×F03×K3<VS and allow an appropriate light intensity with which the drive voltage of the front monitor 123 common to there wavelengths of the BD, DVD and CD is not saturated to be introduced to the light receiving surface 129. Even the optical system different from Embodiment 1 and Embodiment 2 can obtain effects similar to those of Embodiment 1 and Embodiment 2 about the front monitor optical system. Furthermore, this embodiment can compensate for spherical aberration produced when recording/reproducing a two-layer data layer of the DVD by driving the common collimating lens 1906 in the optical axis direction and has the effect of being able to stabilize the recording/reproducing performance of the two-layer data layer. Furthermore, in the objective lens actuator 1918, it is possible to arrange drive sections on both right and left sides of the DVD/CD compatible objective lens 119 and BD objective lens 108 and in areas on the upper side and under side in FIG. 19, and therefore this embodiment also has the effect of being able to improve the driving force of the objective lens actuator.

Embodiment 4

Figure 23:
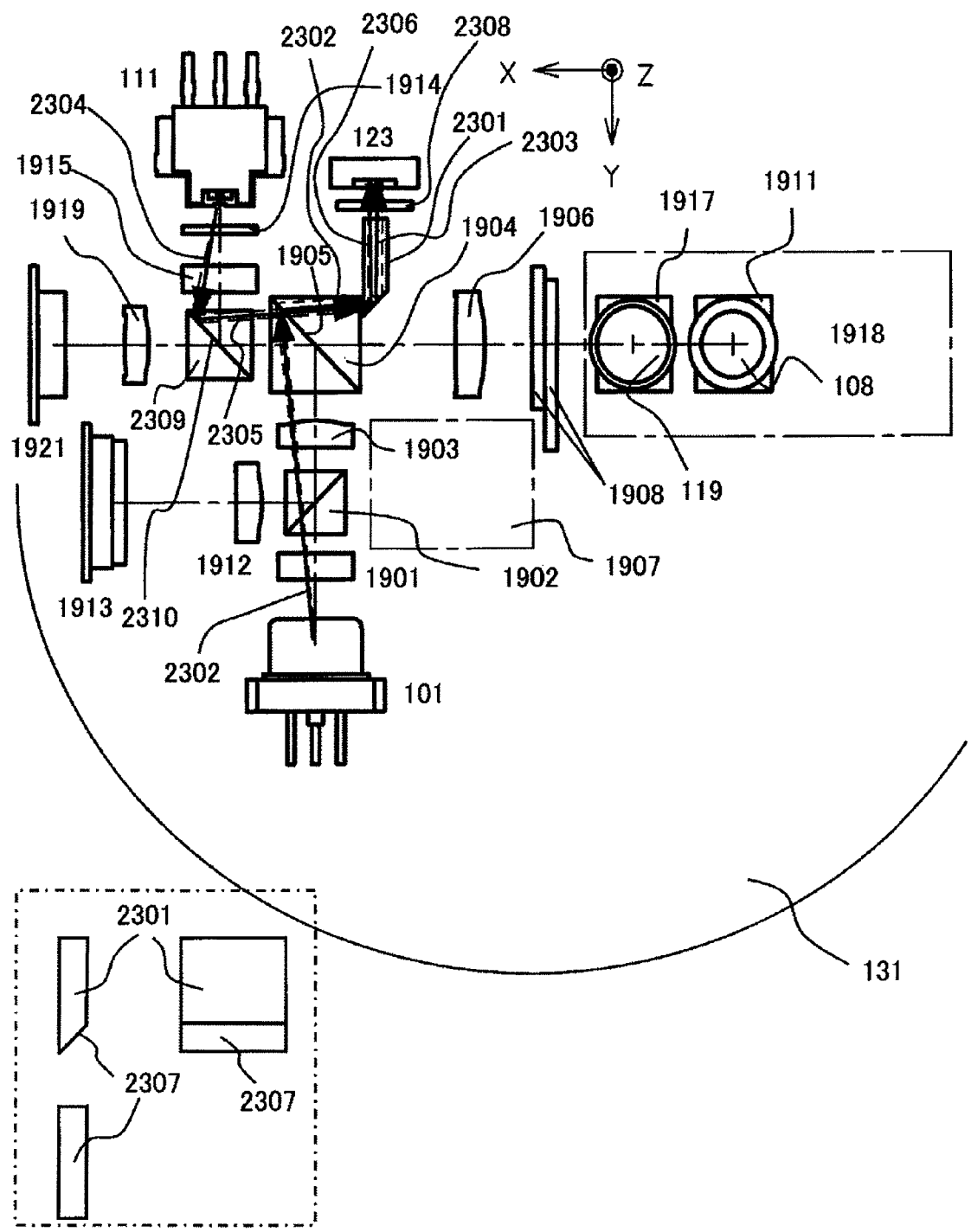
FIG. 23 is a top view showing an outline of an optical pickup corresponding to a BD, DVD and CD in Embodiment 4.

Embodiment 4 of the present invention will be explained using FIG. 23. FIG. 23 is a top view showing an outline of a low-profile optical pickup compatible with a BD, DVD and CD. This embodiment is a modification example of Embodiment 3 and different from Embodiment 3 in that the arrangement of the BD optical system is changed from the diagonal arrangement to a vertical arrangement, the three-wavelength compatible prism 1904 is changed to a rectangular parallelepiped shape, the arrangement of the drive mechanism 1907 of the common collimating lens 1906 is changed from the upper side to the under side of the common collimating lens 1906, the dichroic half prism 1916 is changed to a dichroic PBS prism 2309 and the means for guiding BD, DVD and CD light to the common front monitor 123 is changed. The overall construction of each optical system except these changes is the same as that of Embodiment 3, and therefore explanations thereof will be omitted here.

The front monitor optical system will be explained hereinafter. This embodiment provides an optical waveguide 2301 at an end of the three-wavelength compatible prism 1904 and provides a light intensity adjustment filter 2308 and one front monitor 123 after that. The optical waveguide 2301 has a shape enclosed by a two-dot dashed line at the bottom of the figure, is made of a transparent medium (glass or the like) such as an optical fiber and is provided with the function of guiding light to the common front monitor 123 by letting light pass through the medium.

Of the BD light emitted from a BD laser light source 101, a light beam beyond the effective diameter of a BD objective lens 108 proceeds to the three-wavelength compatible prism 1904 as shown by an arrow 2302, is reflected by a reflecting surface 1905, proceeds as shown by an arrow 2306 and is introduced to the optical waveguide 2301. The light beam is totally reflected by a reflecting surface 2307 of the optical waveguide 2301, proceeds inside the optical waveguide 2301 as shown by an arrow 2303, passes through the light intensity adjustment filter 2308 and then reaches one front monitor 123.

Of the DVD light emitted from the two-wavelength multi-laser 111, the light beam beyond the effective diameter of the DVD/CD compatible objective lens 119 proceeds through the dichroic PBS prism 2309 as shown by an arrow 2304, reflected by a reflecting surface 2310, passes through the three-wavelength compatible prism 1904 as shown by an arrow 2305 and is introduced to the optical waveguide 2301. After that, the light beam is totally reflected by the reflecting surface 2307 of the optical waveguide 2301, proceeds inside the optical waveguide 2301 as shown by the arrow 2306, passes through the light intensity adjustment filter 2308 and then reaches one front monitor 123. The CD light reaches the common front monitor 123 via substantially the same optical path as that of the DVD light. Compared to Embodiment 3, this embodiment simplifies the means for guiding the BD, DVD and CD light to one front monitor 123 and therefore has the effect of facilitating assembly and adjustment.

Embodiment 5

Figure 22:
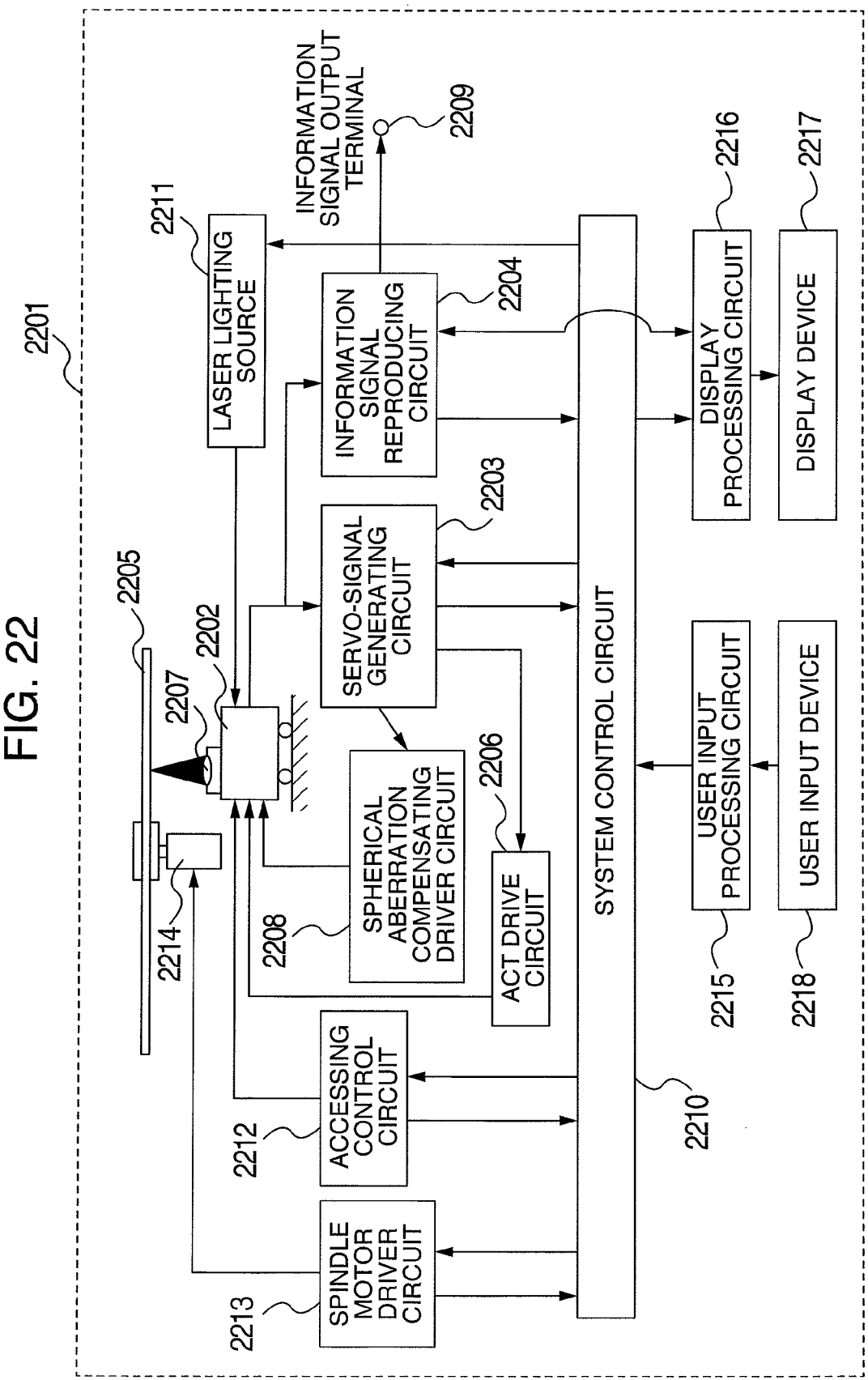
FIG. 22 is a diagram showing schematic blocks of an information recording/reproducing device 2201 which records and reproduces information in Embodiment 5.

Embodiment 1 to Embodiment 4 have explained embodiments concerning an optical pickup of the present invention, but here an embodiment of the light information reproducing device or the light information recording/reproducing device mounted with the above described optical pickup will be explained using FIG. 22. FIG. 22 shows a schematic block diagram of an information recording/reproducing device 2201 which records and reproduces information. Reference numeral 2202 denotes an optical pickup of the present invention and a signal detected from this optical pickup 2202 is sent to a servo signal generating circuit 2203 and an information signal reproducing circuit 2204 in a signal processing circuit. The servo signal generating circuit 2203 generates a focusing control signal, tracking control signal and spherical aberration detection signal suitable for an optical disk medium 2205 from the signal detected by the optical pickup 2202, drives an objective lens actuator in the optical pickup 2202 (not shown) via an objective lens actuator drive circuit 2206 based on these signals and performs position control of an objective lens 2207. Furthermore, the above described optical pickup 2202 generates a spherical aberration detection signal, the above described servo signal generating circuit 2203 drives the compensation lens of the spherical aberration compensation optical system (not shown) in the optical pickup 2202 via a spherical aberration compensating drive circuit 2208 based on this signal. Furthermore, the information signal reproducing circuit 2204 reproduces an information signal recorded in the optical disk medium 2205 from the signal detected from the optical pickup 2202 and outputs the information signal to an information signal output terminal 2209. Some of the signals obtained at the servo signal generating circuit 2203 and information signal reproducing circuit 2204 are sent to a system control circuit 2210. The system control circuit 2210 sends a laser drive recording signal, drives a laser lighting source 2211 and controls an emitting light intensity using one front monitor (not shown) and records a recording signal into the optical disk medium 2205 via the optical pickup 2202. An accessing control circuit 2212 and a spindle motor drive circuit 2213 are connected to this system control circuit 2210 and perform access direction/position control of the optical pickup 2202 and rotation control of the spindle motor 2214 of the optical disk 2205 respectively. When a user controls the above described information recording/reproducing device 2201, the user controls it by instructing a user input processing circuit 2215. Processing conditions or the like of the information recording/reproducing device are displayed by a display processing circuit 2216.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup comprising,
   a first laser source for emitting light beams having respective wavelength λ1 and wavelength λ2 shorter than λ1,
   a first objective lens for focusing the light beams of wavelengths λ1 and λ2 emitted by the first laser source on an information recording surface of an information recording medium,
   a second laser source for emitting a light beam having a wavelength λ3 shorter than λ2,
   a second objective lens for focusing the light beam of wavelength λ3 emitted by the second laser source on the information recording surface of the information recording medium, and
   single light intensity monitoring element for monitoring light intensities of the light beams of wavelengths λ1, λ2 and λ3 emitted by the first and second laser sources,
   wherein the single light intensity monitoring element is configured to monitor the light intensities of parts of the light beams emitted by the first laser source which parts are in an effective diameter of the first objective lens, and the light intensity of a part of the light beam emitted by the second laser source which part is prevented from being in an effective diameter of the second objective lens.

2. The optical pickup according to claim 1, wherein the light intensity monitoring element is arranged between a face on which an emitting surface of the first laser source is arranged and a face on which an emitting surface of the second laser source is arranged,
   a central axis of a light receiving surface of the light intensity monitoring element is distant from a light beam emitting axis of the first laser source, and
   the optical pickup further comprises a reflecting element arranged away from a light beam emitting axis of the second laser source to reflect the light beam.

3. The optical pickup according to claim 2, wherein the optical pickup further comprises a first diverging element and a first collimating lens system to form a first optical system with the first laser source and the first objective lens, and further comprises a second diverging element and a second collimating lens system to form a second optical system with the second laser source and the second objective lens,
   the first objective lens and the second objective lens are juxtaposed to each other in a radial direction of the information recording medium, and
   the first optical system and the second optical system are arranged on one of the sides with respect to a face which passes centers of the first objective lens and the second objective lens and extends perpendicularly to the information recording medium.

4. The optical pickup according to claim 2, wherein the second objective lens has a numerical aperture of 0.85 for a data protecting layer between two information recording surfaces of the information recording medium,
   the optical pickup comprises a collimating lens for receiving the light beam of wavelength λ3 emitted by the second laser source to be adjusted, and
   a drive mechanism for the collimating lens, and
   L is 5-7 times as long as f0 and L is 0.75-0.95 time as long as fcp when L is a distance between surfaces of the collimating lens and the second objective lens converted to a length in air, f0 is a focal distance of the second objective lens and fcp is a focal distance of the collimating lens.

5. The optical pickup according to claim 4, further comprising a first diverging optical element for dividing the light beams emitted by the first laser source and a second diverging optical element for dividing the light beam emitted by the second laser source,
   the first laser source emits the light beam of wave length λ1 in 660 nm band and the light beam of wave length λ2 in 780 nm band,
   the first diverging optical element is a dichroic half mirror for allowing a part of the light beam of wave length λ1 and a part of the light beam of wave length λ2 to proceed through the dichroic half mirror and reflecting the remainder parts thereof to be introduced to the first objective lens,
   the second laser source emits the light beam of wave length λ3 in 405 nm band,
   the second diverging optical element has a first reflecting member for reflecting the light beam emitted from the second laser source to be introduced to the second objective lens and a second reflecting member for changing a proceeding direction of the light beam of wave length λ3 emitted by the second laser source to be introduced to a light receiving surface of the light intensity monitoring element, and
   the second reflecting member is arranged away from the first diverging optical element and inclined to have angles with respect to an axis perpendicular to the information recording medium and to another axis parallel to the information recording medium respectively while the angles are different from each other.

6. The optical pickup according to claim 5, wherein directions of the first laser source and the second laser source parallel to their chip activating layers are substantially parallel to the information recording medium, the light receiving surface of the light intensity monitoring element is arranged in the vicinity of a center of a light intensity distribution in a direction parallel to the chip activating layer of the first laser source and a direction perpendicular to the chip activating layer of the first laser source, and the second reflecting member reflects a light of a position distant from the center of the light intensity distribution in a direction perpendicular to the chip activating layer of the second laser source to be introduced to the light receiving surface of the light intensity monitoring element.

7. The optical pickup according to claim 5, wherein a reflection coefficient of a reflecting surface of the second reflecting member is not more than 50%.

8. The optical pickup according to claim 5, wherein the second reflecting member and the light intensity monitoring element are arranged away from the first objective lens and the second objective lens.

9. An optical pickup comprising,
   a first laser source for emitting light beams having respective wavelength λ1 and wavelength λ2 shorter than λ1,
   a second laser source for emitting a light beam having a wavelength λ3 shorter than λ2, a first objective lens for focusing the light beams emitted by the first laser source on an information recording surface of an information recording medium, a second objective lens for focusing the light beam emitted by the second laser source on the information recording surface of the information recording medium, and a light intensity monitor for monitoring light intensities of the light beams emitted by the first and second laser sources, wherein the light intensity monitor is configured to monitor the light intensities of parts of the light beams emitted by the first laser source which parts are in an effective diameter of the first objective lens, and the light intensity of a part of the light beam emitted by the second laser source which part is prevented from being in an effective diameter of the second objective lens.

10. The optical pickup according to claim 9, wherein the light intensity monitor is arranged to prevent a center of a light receiving surface of the light intensity monitor from being arranged on an imaginary plane along which optical axes of the light beams emitted by the first laser source extend and an optical axis of the light beam emitted by the second laser source extends.

11. The optical pickup according to claim 1, wherein an output power of the first laser source is greater than an output power of the second laser source.

* * * * *